US012801639B2

(12) United States Patent
Chen

(10) Patent No.: US 12,801,639 B2
(45) Date of Patent: Nov. 17, 2026

(54) MAP SEARCH METHOD AND APPARATUS, SERVER, TERMINAL, AND STORAGE MEDIUM

(71) Applicant: Tencent Technology (Shenzhen) Company Limited, Shenzhen (CN)

(72) Inventor: Xiaowei Chen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 19/203,804

(22) Filed: May 9, 2025

(65) Prior Publication Data

US 2025/0265278 A1 Aug. 21, 2025

Related U.S. Application Data

(63) Continuation of application No. PCT/CN2024/079657, filed on Mar. 1, 2024.

(30) Foreign Application Priority Data

Apr. 28, 2023 (CN) ........................ 202310482973.2

(51) Int. Cl.
*G06F 16/29* (2019.01)
*G06F 16/2452* (2019.01)
(Continued)

(52) U.S. Cl.
CPC ........ *G06F 16/29* (2019.01); *G06F 16/24522* (2019.01); *G06N 3/0475* (2023.01); *G06N 3/08* (2013.01)

(58) Field of Classification Search
CPC ............... G06F 16/29; G06F 16/24522; G06F 16/9032; G06F 16/9035; G06F 16/909;
(Continued)

(56) References Cited

U.S. PATENT DOCUMENTS 10,268,756 B2 * 4/2019 Burlik ................ G01C 21/3667
12,511,281 B1 * 12/2025 Curtis ................ G06F 16/2423
(Continued)

FOREIGN PATENT DOCUMENTS

CN 107491489 A 12/2017
CN 110310631 A 1/2022
(Continued)

OTHER PUBLICATIONS

PctCN2024079657 written opinion translation (Year: 2024).*
(Continued)

*Primary Examiner* — Michael Pham
(74) *Attorney, Agent, or Firm* — Crowell & Moring LLP

(57) ABSTRACT

A map search method is provided, performed by a server, and including: obtaining a map search request transmitted by a terminal, the map search request including map search content, and the map search content being natural language content (401); inputting the map search content into a generative language model in response to the map search request, to obtain search requirement information generated by the generative language model, the search requirement information being configured for representing a search requirement of the map search content (402); querying a preset map database for a search result matching the search requirement information (403); and feeding back the search result to the terminal, so that the terminal presents the search result on a map interface (404).

20 Claims, 13 Drawing Sheets

(51) Int. Cl.
*G06N 3/0475* (2023.01)
*G06N 3/08* (2023.01)

(58) Field of Classification Search
CPC ............... G06F 16/907; G06F 16/9532; G06F 16/951; G06F 16/9537; G06F 40/35; G06F 16/90328; G06F 16/90332; G06N 3/0475; G06N 3/04; G06N 3/047; G06N 3/08; G06N 3/0895; G06N 3/09; G06N 3/091; G06N 3/092; G06N 3/094; G06N 3/096; G06N 3/098; G06N 3/0985; G06N 3/0455; G06N 3/045; G06N 3/088
USPC .......................................................... 707/737
See application file for complete search history.

(56) References Cited

U.S. PATENT DOCUMENTS

| | | | | |
|---|---|---|---|---|
| 2011/0055187 | A1* | 3/2011 | Cai | G06F 16/9537 707/706 |
| 2022/0013108 | A1 | 1/2022 | Knight et al. | |
| 2022/0027413 | A1* | 1/2022 | Quint | G06F 16/9535 |
| 2022/0237368 | A1 | 7/2022 | Tran | |
| 2024/0210194 | A1* | 6/2024 | Sharifi | G10L 15/22 |
| 2025/0058134 | A1* | 2/2025 | Kaib | A61B 5/7475 |
| 2026/0050635 | A1* | 2/2026 | Yates | G06F 16/90324 |

FOREIGN PATENT DOCUMENTS

| | | | | |
|---|---|---|---|---|
| CN | 114036373 | A | 2/2022 | |
| CN | 115640308 | A | 1/2023 | |
| CN | 115794999 | A | 3/2023 | |
| CN | 116011425 | A | 4/2023 | |
| WO | WO-2011059777 | A1 * | 5/2011 | G01C 21/3608 |

OTHER PUBLICATIONS

International Search Report (PCT/ISA/210) and Written Opinion issued in PCT Application No. PCT/CN2024/079657 dated Mar. 1, 2024 with English translations (14 pages).

* cited by examiner

MAP SEARCH METHOD AND APPARATUS, SERVER, TERMINAL, AND STORAGE MEDIUM

RELATED APPLICATION

This application is a continuation of and claims the benefit of priority to PCT International Patent Application No. PCT/CN2024/079657 filed on Mar. 1, 2024, and Chinese Patent Application No. 2023104829732 filed on Apr. 28, 2023, both entitled "MAP SEARCH METHOD AND APPARATUS, SERVER, TERMINAL, AND STORAGE MEDIUM", which are incorporated by reference in their entireties.

FIELD OF THE TECHNOLOGY

The embodiments of this disclosure relate to the field of computer technologies, and in particular, to a map search method and apparatus, a server, a terminal, and a storage medium.

BACKGROUND OF THE DISCLOSURE

Map applications are widely used in life scenarios, and provide services such as location search and route navigation for people.

In related art, a user inputs a query text or auditory input into a search bar in a map application, and the map application returns multiple candidate locations for the user to view and select. Alternatively, the user queries a navigation route after selecting a location, and the map application returns multiple feasible route plans based on a travelling manner specified by the user.

However, efficiency of performing location search or route navigation by using the foregoing manner is relatively low. For example, the map application may not understand a requirement from a user, and the user may need to manually adjust a query keyword so that a search result meeting the user requirement is returned.

SUMMARY

The embodiments of this disclosure provide a map search method and apparatus, a server, a terminal, and a storage medium. The technical solution is as follows:

According to one aspect, the embodiments of this disclosure provide a map search method performed by a server, and the method includes:

obtaining a map search request transmitted by a terminal, the map search request including map search content, and the map search content being natural language content;

inputting the map search content into a generative language model in response to the map search request, to obtain search requirement information generated by the generative language model, the search requirement information being configured for representing a search requirement of the map search content;

querying a preset map database for a search result matching the search requirement information; and feeding back the search result to the terminal, so that the terminal presents the search result on a map interface.

According to one aspect, the embodiments of this disclosure provide another map search method performed by a terminal, and the method includes:

obtaining map search content, the map search content being natural language content;

transmitting a map search request including the map search content to a server, the map search request being used for instructing the server to input the map search content into a generative language model, to obtain search requirement information generated by the generative language model and query a preset map database for a search result matching the search requirement information, the search requirement information being configured for representing a search requirement of the map search content; and presenting, on a map interface, the search result fed back by the server.

According to one aspect, the embodiments of this disclosure provide a map search apparatus, and the apparatus includes:

an obtaining module, configured to obtain a map search request transmitted by a terminal, the map search request including map search content, and a map search text being natural language content;

a generating module, configured to input the map search content into a generative language model in response to the map search request, to obtain search requirement information generated by the generative language model, the search requirement information being configured for representing a search requirement of the map search content;

a matching module, configured to query a preset map database for a search result matching the search requirement information; and a feedback module, configured to feed back the search result to the terminal, so that the terminal presents the search result on a map interface.

According to one aspect, the embodiments of this disclosure provide another map search apparatus, and the apparatus includes:

an obtaining module, configured to obtain map search content, the map search content being natural language content;

a transmitting module, configured to transmit a map search request comprising the map search content to a server, the map search request being used for instructing the server to input the map search content into a generative language model, to obtain search requirement information generated by the generative language model and query a preset map database for a search result matching the search requirement information, the search requirement information being configured for representing a search requirement of the map search content; and a presentation module, configured to present, on a map interface, the search result fed back by the server.

According to another aspect, the embodiments of this disclosure provide a server, including a processor and a memory, the memory having at least one piece of program code stored therein, and the at least one piece of program code being loaded and executed by the processor, to implement the map search method according to any one of the foregoing embodiments.

According to another aspect, the embodiments of this disclosure provide a terminal, including a processor and a memory, the memory having at least one instruction stored therein, and the at least one instruction being loaded and executed by the processor to implement the map search method according to the foregoing aspects.

According to another aspect, the embodiments of this disclosure provide a computer-readable storage medium, the computer-readable storage medium having at least one instruction stored therein, and the instruction being loaded and executed by a processor to implement the map search method according to the foregoing aspects.

According to another aspect, the embodiments of this disclosure provide a computer program product, the computer program product including a computer instruction, the computer instruction being stored in a computer-readable storage medium. A processor of a terminal reads the computer instruction from the computer-readable storage medium, and the processor executes the computer instruction, so that the terminal executes the methods provided in various optional implementations according to the foregoing aspects.

Details of one or more embodiments of this disclosure are provided in the accompanying drawings and descriptions below. Other features, objectives, and advantages of this disclosure become apparent from the specification, the drawings, and the claims.

BRIEF DESCRIPTION OF THE DRAWINGS

To describe the technical solutions of the embodiments of this disclosure more clearly, the following briefly introduces the accompanying drawings required for describing the embodiments. Apparently, the accompanying drawings in the following description show only some embodiments of this disclosure, and a person of ordinary skill in the traditional technology may still derive other drawings from these accompanying drawings without creative efforts.

DESCRIPTION OF EMBODIMENTS

The technical solutions in the embodiments of this disclosure are to be clearly and completely described below in combination with the drawings in the embodiments of this disclosure. It is clear that the described embodiments are only part of the embodiments of this disclosure, rather than all the embodiments. Based on the embodiments of this disclosure, all other embodiments obtained by a person skilled in the art without making any creative work shall fall within the scope of protection of this disclosure.

In a related technology, when a user inputs a query text or voice in a search bar in a map application, and the map application returns a result for the user to select to view, the result may not meet a requirement of the user.

Figure 1:
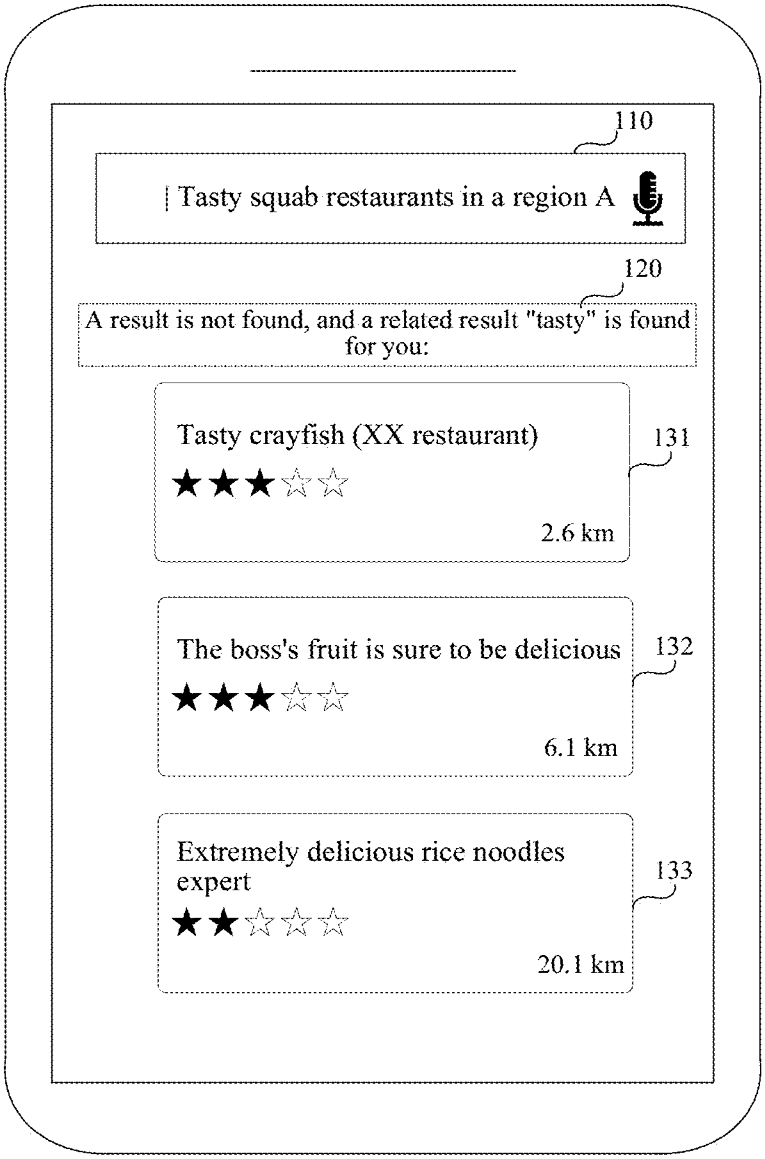
FIG. 1 is a schematic diagram of a process of performing map search based on an input text in the related technology.

Refer to FIG. 1, FIG. 1 is a schematic diagram of a process of performing map search based on an input text in the related technology.

When a user inputs a text "tasty squab restaurants in a region A" into a search bar 110, a map application returns a prompt box 120 "No result is found, find a result related to 'tasty' for you:", and then three restaurants: a restaurant 131, a restaurant 132, and a restaurant 133 whose names include "good" are recommended to the user. None of the restaurants is a squab restaurant located in the region A that a user needs.

It can be known from FIG. 1 that, the map application misunderstands an intention of the user, and focuses a search on the adjective "good", rather than "the region A" and "the squab" that the user needs. Therefore, the user needs to adjust the input text to obtain a more accurate search result.

Figure 2:
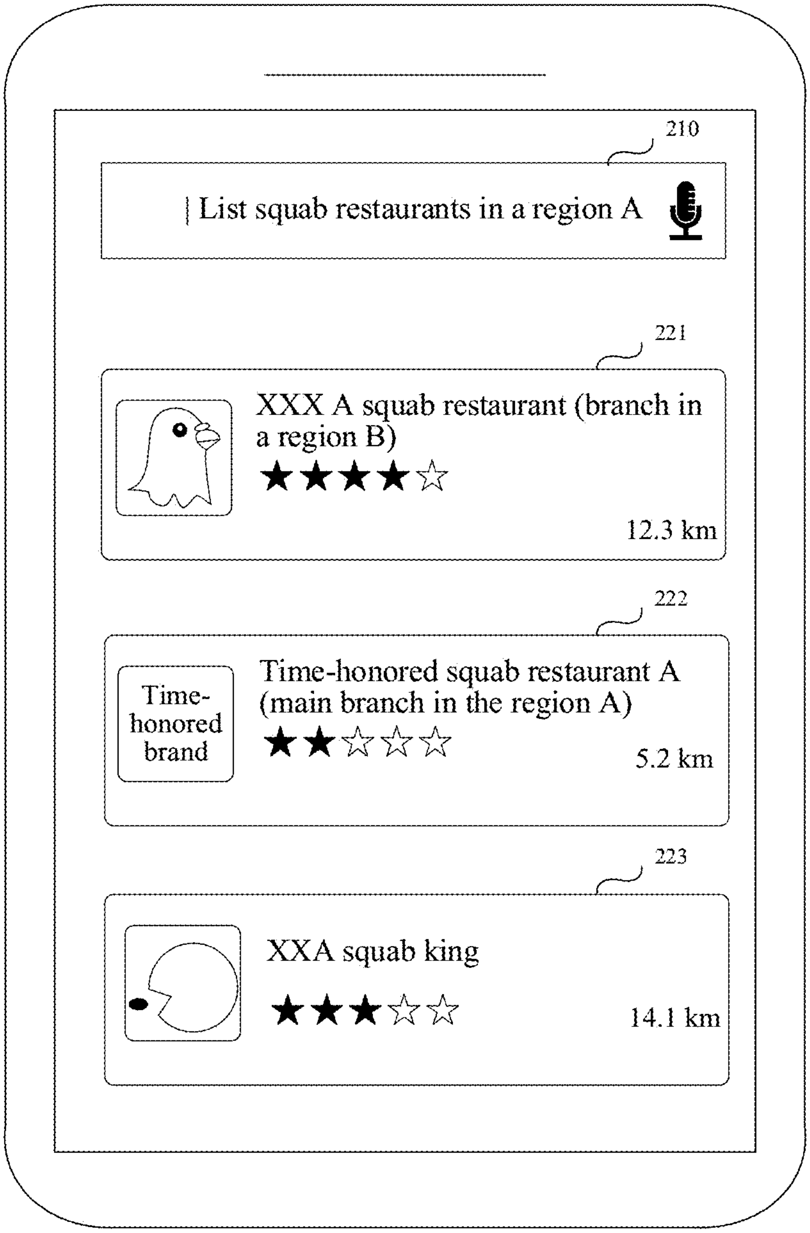
FIG. 2 is a schematic diagram of a process of performing map search based on an adjusted input text in the related technology.

Refer to FIG. 2, FIG. 2 is a schematic diagram of a process of performing map search based on an adjusted input text in the related technology.

As shown in FIG. 2, when a user adjusts an input text to "list squab restaurants in a region A" in a search bar 210, a map application recommends three squab restaurants: a restaurant 221, a restaurant 222, and a restaurant 223 to the user. A name of the squab restaurant 221 is "XXXA squab restaurant (branch in a region B)", from which it can be known that this is a squab restaurant located in the region B area in a city C, and appears in a recommendation list only because the name of the restaurant includes the word "A", but does not meet the user's intention that the restaurant needs to be located in the region A. A name of the squab restaurant 222 is "time-honored squab restaurant A (main branch in the region A)". It can be learned that this is a squab restaurant located in a region A of the city C. However, an overall rating of this restaurant is only two stars, and therefore does not meet a feature of being "tasty" that the user intends. The squab restaurant 223 is named "XXA squab king" and also appears in the recommendation list because the name includes the letter "A", but the restaurant may not actually be located in the region A.

It can be learned from FIG. 2 that, even if the user adjusts the input text, the map application may still not understand the intention of the user well and return a search result satisfying the user.

To understand requirements of a user more deeply, and recommend an authentic, a reliable, and an effective search result to the user, this disclosure provides a map search method. The method includes: obtaining a map search request transmitted by a terminal; inputting map search content into a generative language model in response to the map search request, to obtain search requirement information generated by the generative language model; querying a preset map database for a search result matching the search requirement information; and feeding back the search result to the terminal, so that the terminal presents the search result on a map interface.

Figure 3:
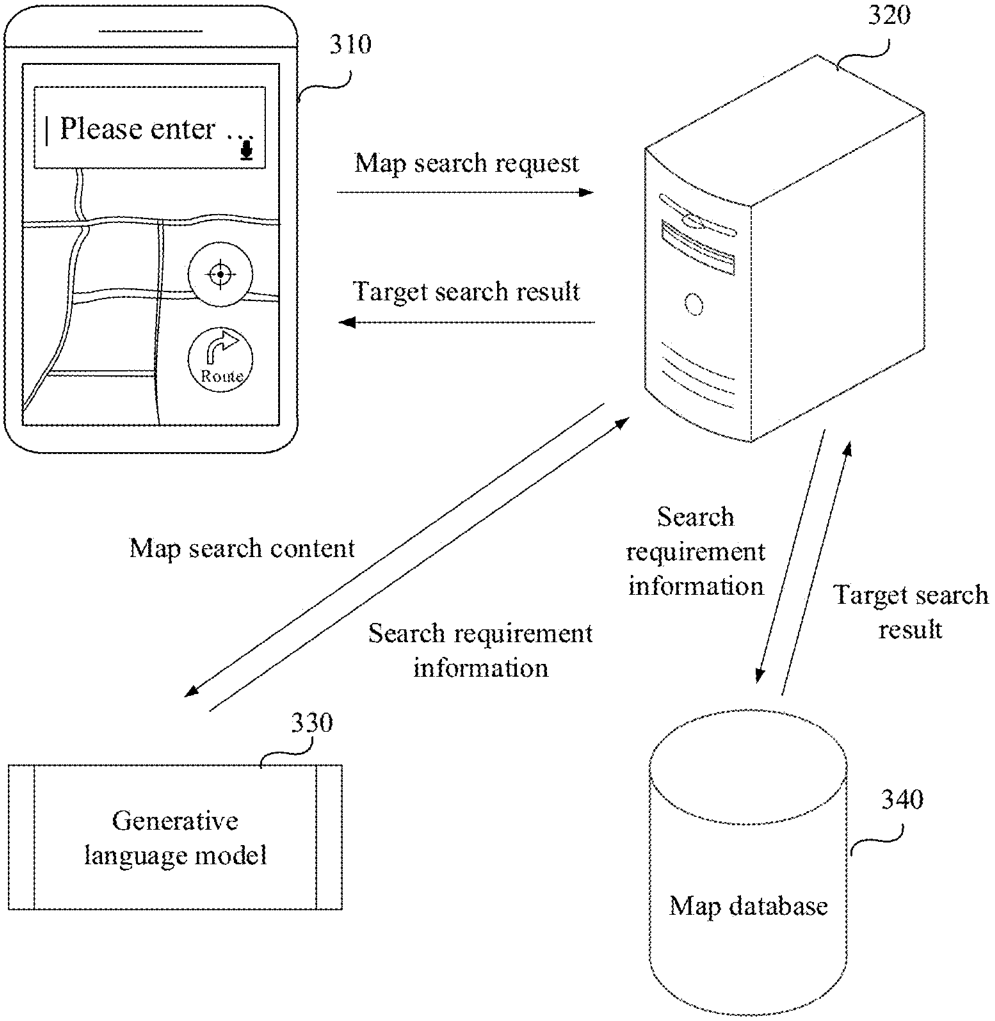
FIG. 3 is a schematic diagram of an implementation environment according to an exemplary embodiment of this disclosure.

FIG. 3 is a schematic diagram of an implementation environment according to an exemplary embodiment of this disclosure.

The implementation environment includes a terminal 310, a server 320, a generative language model 330, and a map database 340.

The terminal 310 is an electronic device that can run a map application program. The electronic device may be a mobile terminal such as a smartphone, a tablet computer, a laptop computer, or an in-vehicle terminal, or may be a terminal such as a desktop computer or a projection computer. For example, the terminal 310 is the in-vehicle terminal, and the terminal 310 may obtain map search content input by a user by using a voice. For another example, the terminal 310 is the smartphone, and the terminal 310 may obtain map search content input by a user by using a text on a map interface. An example in which the terminal 310 is the smartphone is used below for exemplary description, but this is not limited thereto.

In some embodiments, the terminal 310 generates a map search request based on content that a user searches for in a map, and transfers the map search request to the server 320. The server 320 feeds back a corresponding search result to the terminal, so that the terminal presents the search result on the map interface.

The server 320 is a background server of the map application program. The server 320 may be an independent physical server, or may be a server cluster or a distributed system including multiple physical servers, or may be a cloud server providing basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform.

In some embodiments, the server 320 transfers the map search content to the generative language model 330, and generates, by using the generative language model 330, the search requirement information that corresponds to the map search content.

The generative language model 330 is a machine learning model obtained by performing pre-training on a large-scale text corpus. For example, a generative pre-trained transformer (GPT) model includes GPT-1, GPT-2, GPT-3, GPT-3.5, GPT-4, and the like, and a subsequent iteration model thereof.

The GPT model is a large language model cultivated by the OpenAI company by performing pre-training based on a huge amount of training samples and a huge parameter system. Using GPT-3 as an example, a depth of model training layers of GPT-3 reaches 96 layers, a dimension of hidden layers reaches 12288, and a parameter amount is as high as 175 billion, and a relatively complex, coherent, and creative text can be generated.

A training process of the GPT model includes two phases. The first stage is to perform pre-training in an unsupervised form by using a large-scale unmarked text corpus. The second stage is to perform fine-tuning in a supervised form by using a marked text corpus for a specific downstream task.

In some embodiments, the generative language model 330 may be configured in the server 320, or may be configured in another server, and is invoked by the server 320 through a corresponding interface.

In some embodiments, the server 320 queries the map database 340 for a search result matching the search requirement information.

The map database 340 is a database based on digitalized data of a map. In some embodiments, the map database includes point of interest (POI) data, location based services (LBS) data, and navigation data.

In some embodiments, a source of data in the map database may include satellite data, road network data, surveying and mapping data, crowd-sourced collection data, and the like.

In some embodiments, the source of data in the map database may further include Internet data, user search data, user feedback data, and the like. For example, the map database may include data such as comments of users on merchants and ratings of places that are collected on the Internet.

In some embodiments, data in the map database is updated in real time. For example, the map database may include real-time updated road conditions such as real-time traffic, traffic lights, and road congestion. For another example, the map database may include POI data updated in real time. When information such as an address, a name, and contact information of the POI changes, content in the map database is updated in time.

In some embodiments, the map database 340 may be an independent database, or may be configured in the server 320.

The foregoing embodiments merely describe a general architecture of the implementation environment, and the system may further include more or fewer components, or some components may be combined, which is not limited in the embodiments.

Figure 4:
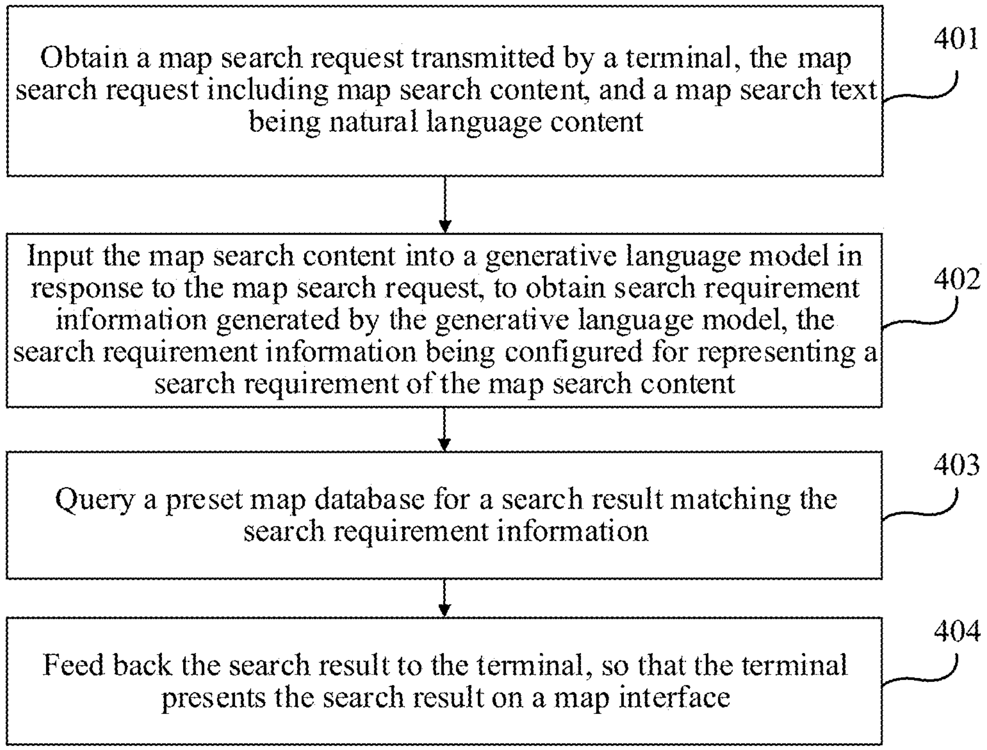
FIG. 4 is a flowchart of a map search method according to an exemplary embodiment of this disclosure.

FIG. 4 is a flowchart of a map search method according to an exemplary embodiment of this disclosure. The method includes the following operations:

Operation 401: Obtain a map search request transmitted by a terminal, the map search request including map search content, a map search text being natural language content.

The terminal is an electronic device that can run a map application program. The electronic device may be a mobile terminal such as a smartphone, a tablet computer, a laptop computer, or an in-vehicle terminal, or may be a terminal such as a desktop computer or a projection computer.

The map search request is a request transmitted by the terminal to a server. The map search request includes the map search content, and the map search content is natural language content.

In some embodiments, the map search request is a query request for a location, or a query request for a navigation route.

In some embodiments, the map search content is a natural language text input by a user into a text search bar on a map interface.

In some embodiments, the map search content is natural language audio input by a user on an in-vehicle terminal.

For example, the map search content may be one or more words, phrases, sentences, or paragraphs used for map search. For example, the map search content may be "the best squab restaurant in a region A", or "the buildings in a city D have both ancient and modern charm, please plan a tour route from a scenic spot E to a street F for an out-of-town tourist, which needs to pass through at least one special scenic spot in a city D".

Exemplarily, the map search content may be direct descriptions of the map search requirement, for example, "Help me find a mid-range Cantonese restaurant", and "list hospitals in a city C in which corneal cross-linking surgery can be performed". Alternatively, the map search requirement may be indirectly described, for example, "The temperature remains high during the Labor Day holiday, and instead of traveling far away, it is better to meet friends for tea and enjoy air conditioning".

Operation 402: Input the map search content into a generative language model in response to the map search request, to obtain search requirement information generated by the generative language model, the search requirement information being configured for representing a search requirement of the map search content.

The search requirement information is information configured for classifying or describing the map search requirement. In some embodiments, the search requirement information may include classification tag information, for example, an administrative division or a location category to which the map search requirement belongs. In some embodiments, the search requirement information may include requirement description information, for example, an environment feature and an atmosphere feature of the map search requirement. In some embodiments, the search requirement information may be a natural language text, for example, one or more words, phrases, sentences, or paragraphs.

Operation 403: Query a preset map database for a search result matching the search requirement information.

The map database is a database based on digitalized data of a map. In some embodiments, the map database includes point of interest (POI) data, location based services (LBS) data, and navigation data.

In some embodiments, a source of data in the map database may include satellite data, road network data, surveying and mapping data, crowd-sourced collection data, and the like.

In some embodiments, the source of data in the map database may further include Internet data, user search data, user feedback data, and the like. For example, the map database may include data such as comments of users on merchants and ratings of places that are collected on the Internet.

In some embodiments, data in the map database is updated in real time. For example, the map database may include real-time updated road conditions such as real-time traffic, traffic lights, and road congestion. For another example, the map database may include POI data updated in real time. When information such as an address, a name, and contact information of the POI changes, content in the map database is updated in time.

The search result matching the search requirement information refers to a search result satisfying a search requirement of the map search content.

In some embodiments, there are one or more search results. For example, when the map search content is "the best squab restaurant in a region A", the search result matching the search requirement information may be a squab restaurant with a highest overall ranking, or multiple squab restaurants (such as top three) with high overall rankings.

In a possible implementation, the server may determine a location query statement or a navigation route query statement based on the search requirement information, and query, based on the location query statement or the navigation route query statement, the map database for the search result matching the search requirement information.

For example, the location query statement or the navigation route query statement may be a DSL statement, a SQL statement, or the like.

Operation 404: Feed back the search result to the terminal, so that the terminal presents the search result on a map interface.

In some embodiments, the map interface is an interface corresponding to a map application in the terminal, or an interface corresponding to a map mini program.

In a possible implementation, the terminal presents the search result on the map interface in a form of a position. For example, when the map search content is "the best squab restaurant in a region A", the terminal displays, on the map interface, a position of the squab restaurant that ranks the highest comprehensively, and displays other information about the squab restaurant.

In a possible implementation, the terminal presents the search result in a form of a list on the map interface. For example, when the map search content is "the best squab restaurant in a region A", the terminal displays thumbnails of top three squab restaurants in the form of a list in a descending order of comprehensive ratings on the map interface.

In a possible implementation, the terminal presents the search result in a form of a navigation route on the map interface. For example, when the map search content is "a tour route including a scenic spot E and a street F", the terminal displays a map of a city D on the map interface, and visually identifies one or more recommended tour routes including the scenic spot E and the street F. If there are multiple routes, different colors, shades, and the like may be set based on comprehensive ratings.

The terminal may further present the search result in another form on the map interface. This is not limited in this specification.

In conclusion, the search requirement information is generated by using the generative language model, and the search result is obtained through querying from the map database based on the search requirement information, to further understand a search intention of a user, and recommend an authentic and a reliable search result to the user, thereby improving map search efficiency.

To understand a search intention of a user deeply, and recommend a result satisfying a user requirement, a search result may be determined with reference to the generative language model.

Figure 5:
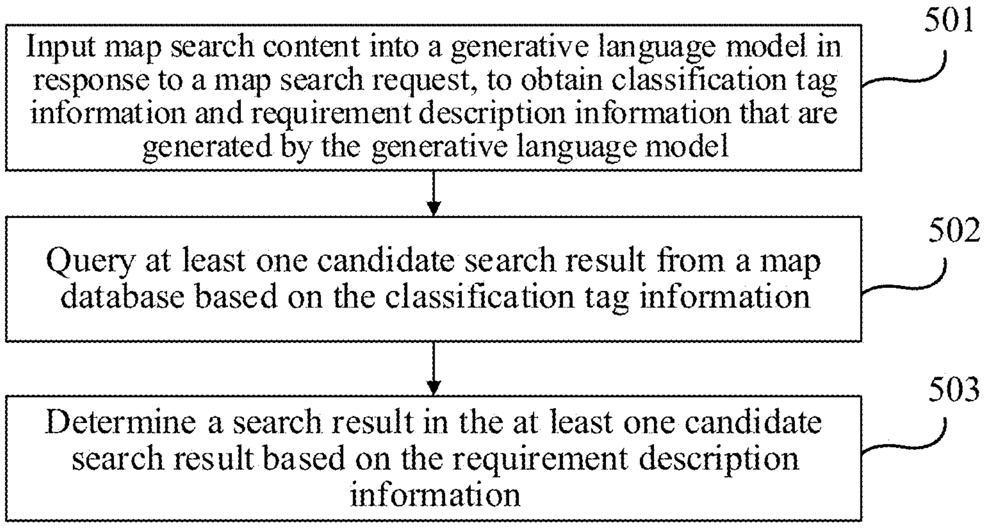
FIG. 5 is a flowchart of determining a search result according to an exemplary embodiment of this disclosure.

Refer to FIG. 5, FIG. 5 is a flowchart of determining a search result according to an exemplary embodiment of this disclosure, which includes the following operations.

Operation 501: Input map search content into a generative language model in response to a map search request, to obtain classification tag information and requirement description information that are generated by the generative language model.

The classification tag information includes at least one classification tag corresponding to a search requirement, and the classification tag is a tag used by a map database to classify map elements.

In some embodiments, when the search result is a place, the classification tag may be an administration division tag of the search result. For example, for map search content "the best squab restaurant in a region A", the classification tag may be "city C" and "region A". In some embodiments, the classification tag may include multiple levels of tags. In some embodiments, the administration division tag may be determined based on a zip code corresponding to an administration division. For example, the administration division tag may include a first-level administration division tag "518000" to represent a city C, and a second-level administration division tag "518107" to represent a region A.

In some embodiments, when the search result is a location, the classification tag may be a location attribute tag of the search result. For example, for the map search content "the best squab restaurant in a region A", the location attribute tag may include a first-level location attribute tag "restaurant" and a second-level location attribute tag "Cantonese restaurant".

In some embodiments, when the search result is a navigation route, the classification tag may be a road attribute tag of the search result. The road attribute tag includes, but is not limited to, a road type, a road level, a travelling direction, a road width, a road name, and the like.

In some embodiments, when the search result is the navigation route, the classification tag may be a time requirement tag of the search result. For example, the time requirement tag may include a longest time limit for navigation, used for representing a maximum value of a time length required for completing the navigation route. Alternatively, the time requirement tag may include a travel time, used to indicate a time segment (such as an early peak time segment or a noon time segment) in which route navigation is performed.

The requirement description information is configured for performing natural language description on a search requirement.

In some embodiments, the requirement description information is a sentence or a segment of natural language text that describes the search requirement.

In some embodiments, when the search result is a place, the requirement description information may include descriptions about aspects such as an environment feature, an atmosphere feature, an average price per person, and business hours of the search requirement.

For example, for map search content "find a calm place to drink tea", the requirement description information may be "tea house or tea room with good environment, quiet atmosphere, and few customers". For the map search content "where can I experience the grand occasion of the Water Splashing Festival in Yunnan", the requirement description information can be "lively places with a strong folk cultural atmosphere and open during the Water Splashing Festival."

In some embodiments, when the search result is a navigation route, the requirement description information may include descriptions about aspects such as a start point, an end point, a transportation manner, a road condition, and navigation duration of the search requirement.

For example, for the map search content "What is the fastest way to go from Du Fu Thatched Cottage to People's Park", the requirement description information can be "a navigation route with a start point at the main gate of Du Fu Thatched Cottage and an end point at the main gate of People's Park, good road conditions, no congestion, and short travel time."

Figure 6:
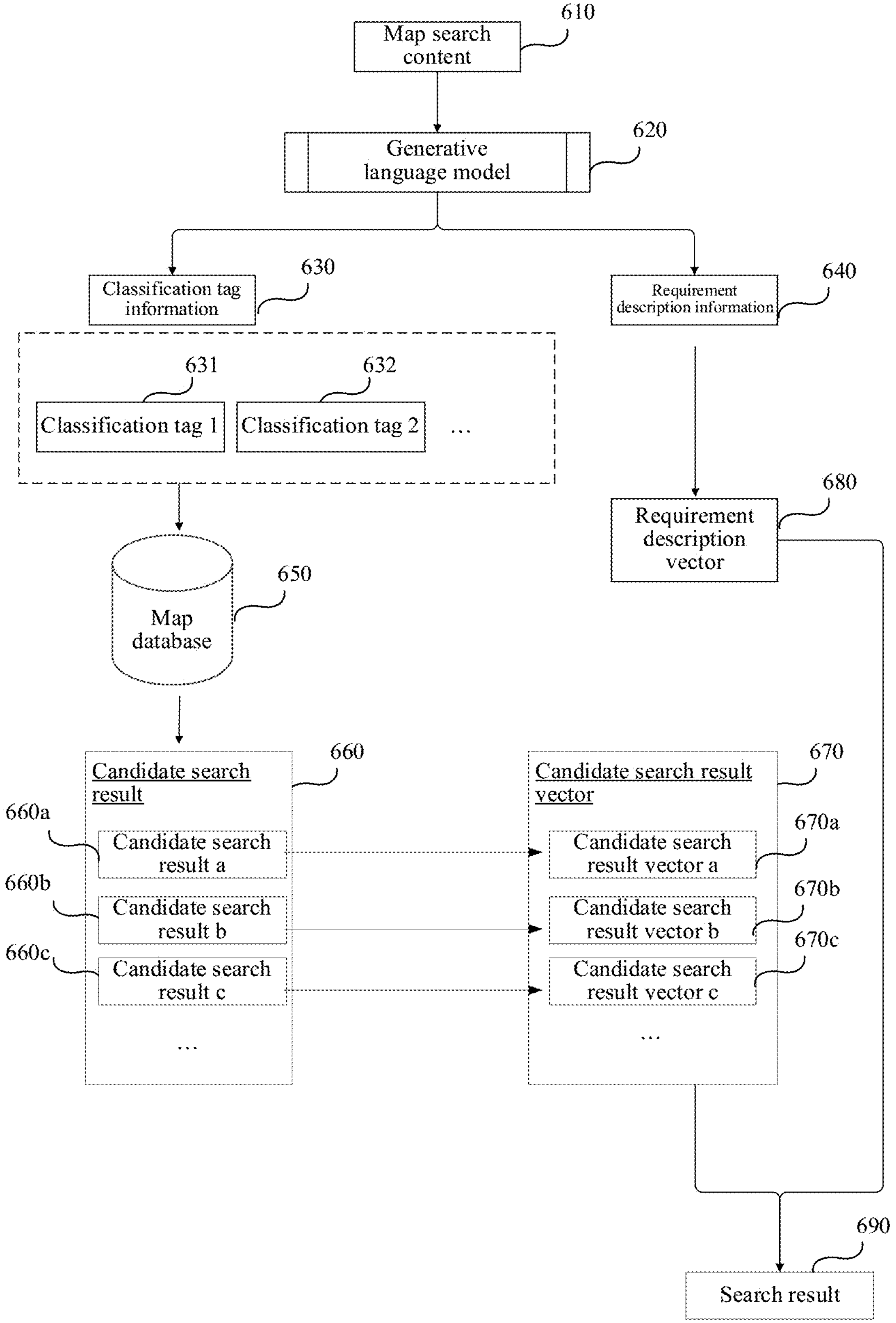
FIG. 6 is a schematic diagram of determining a search result according to an exemplary embodiment of this disclosure.

Refer to FIG. 6, FIG. 6 is a schematic diagram of determining a search result according to an exemplary embodiment of this disclosure.

As shown in FIG. 6, map search content 610 is processed by using a generative language model 620, to obtain classification tag information 630 and requirement description information 640. The classification tag information 630 includes multiple classification tags, such as a classification tag 1 (631) and a classification tag 2 (632).

Operation 502: Query at least one candidate search result from the map database based on the classification tag information.

In a possible implementation, the server determines a location query statement or a navigation route query statement based on the classification tag information, and queries, based on the location query statement or the navigation route query statement, the map database for a search result matching the search requirement information.

For example, the location query statement or the navigation route query statement may be a domain-specific language (DSL), a structured query language (SQL), or the like.

In some embodiments, the candidate search result is a result pre-stored in the map database. For example, when the search result is a location, the candidate search result may be POI data pre-stored in the map database.

In some embodiments, the candidate search result is a result obtained through real-time calculation based on the map database. For example, when the search result is a navigation route, the candidate search results may be multiple candidate routes calculated in real time based on the map database.

As shown in FIG. 6, a map database 650 is queried for at least one candidate search result 660 based on the classification tag information 630. For example, the candidate search result 660 may include a candidate search result a (660*a*), a candidate search result b (660*b*), a candidate search result c (660*c*), . . . , and the like.

In some embodiments, when the search result is a place, the candidate search result 660 may include thousands pieces of candidate POI data.

In some embodiments, each candidate search result corresponds to a candidate search result vector. For example, the candidate search result a (660*a*) corresponds to a candidate search result vector a (670*a*). The candidate search result b (660*b*) corresponds to a candidate search result vector b (670*b*). The candidate search result c (660*c*) corresponds to a candidate search result vector c (670*c*).

A method for determining a candidate search result vector corresponding to a candidate search result may include at least one of the following manners.

1. Determine a location feature vector corresponding to a candidate location as the candidate search result vector in case that the candidate search result is a candidate location.

In a possible implementation, the location feature vector corresponding to the candidate location may be determined based on POI data in the map database. For example, vectorization is performed on a location name, introduction information, business hours, and the like of the POI data, to obtain the location feature vector corresponding to the candidate location.

In a possible implementation, the location feature vector corresponding to the candidate location may further be determined based on data such as Internet data and user feedback data in the map database. For example, the location feature vector corresponding to the candidate location may be extracted from the POI data, related introduction articles on the Internet, and user comments by using a feature extraction network.

2. Obtain a road segment feature vector corresponding to each road segment in a candidate route in a case that the candidate search result is the candidate route; generate a candidate route feature vector of the candidate route based on the road segment feature vector; and determine the candidate route feature vector as a candidate search result vector.

In a possible implementation, the road segment feature vector corresponding to each road segment in the candidate route may be determined based on data pre-stored in the map database. For example, a road segment feature vector is extracted from road network data corresponding to the road segment through the feature extraction network.

In a possible implementation, the road segment feature vector corresponding to each road segment in the candidate route may be determined based on data updated in real time in the map database. For example, the road segment feature vector is extracted from real-time data, such as a traffic flow, a traffic light status, and a road congestion status, corresponding to the road segment by using the feature extraction network.

In some embodiments, road segment feature vectors corresponding to multiple road segments are concatenated, to generate the candidate route feature vector of the candidate route.

Operation 503: Determine a search result from the at least one candidate search result based on the requirement description information.

In some embodiments, vectorization may be performed on the requirement description information, to obtain requirement description vector; a vector distance between the requirement description vector and the candidate search result vector corresponding to the at least one candidate search result is determined; and a search result matching the search requirement information is determined in the at least one candidate search result based on the vector distance.

As shown in FIG. 6, vectorization may be performed on the requirement description information 640, to obtain a requirement description vector 680.

In some embodiments, vectorization processing is performed on the requirement description information 640 based on an embedding layer in natural language processing.

In some embodiments, a search result 690 may be a candidate search result (for example, the candidate search result a) corresponding to a candidate search result vector closest to the requirement description vector 680.

In some embodiments, the search result 690 may be N candidate search results (for example, the candidate search result a and the candidate search result b, where N=2) corresponding to first N candidate search result vectors closest to the requirement description vector 680. N is a preset positive integer.

In this embodiment, the classification tag information is generated by using the generative language model, and the classification tag corresponding to the search result expected by the user may be obtained, to determine, in the map database, the candidate search result matching the classification tag. The requirement description information is generated by using the generative language model, so that intentions and requirements of the user can be deeply understood. The search result is determined based on the vector distance between the requirement description vector and the candidate search result vector, so that a search result that best meets a user requirement can be selected from the candidate search results, and the user does not need to view and compare each candidate search result in sequence, thereby improving map search efficiency.

When the map search content is input into the generative language model, to make an output result of the model the classification tag information, first prompt information may be input into the generative language model, to prompt that an output format of an output result is the classification tag information.

In some embodiments, the map search content and the first prompt information are input into the generative language model, to obtain the classification tag information output by the generative language model.

In some embodiments, the first prompt information is a sentence or a segment of a natural language text. For example, the first prompt information may be "please determine at least one classification tag" or "please output an administrative division tag and a location attribute tag that correspond to the search requirement".

In some embodiments, the first prompt information and the map search content may be concatenated, and a text obtained through the concatenation is input into the generative language model. The first prompt information may be located at any position including the beginning, the middle, or the end of the text.

The first prompt information is configured for prompting that an output result of the generative language model is the classification tag information. To enable the generative language model to understand a meaning of the first prompt information, the pre-trained generative language model may be trained by using a training sample including the first prompt information. The training process is performing fine-tuning based on pre-training.

Figure 7:
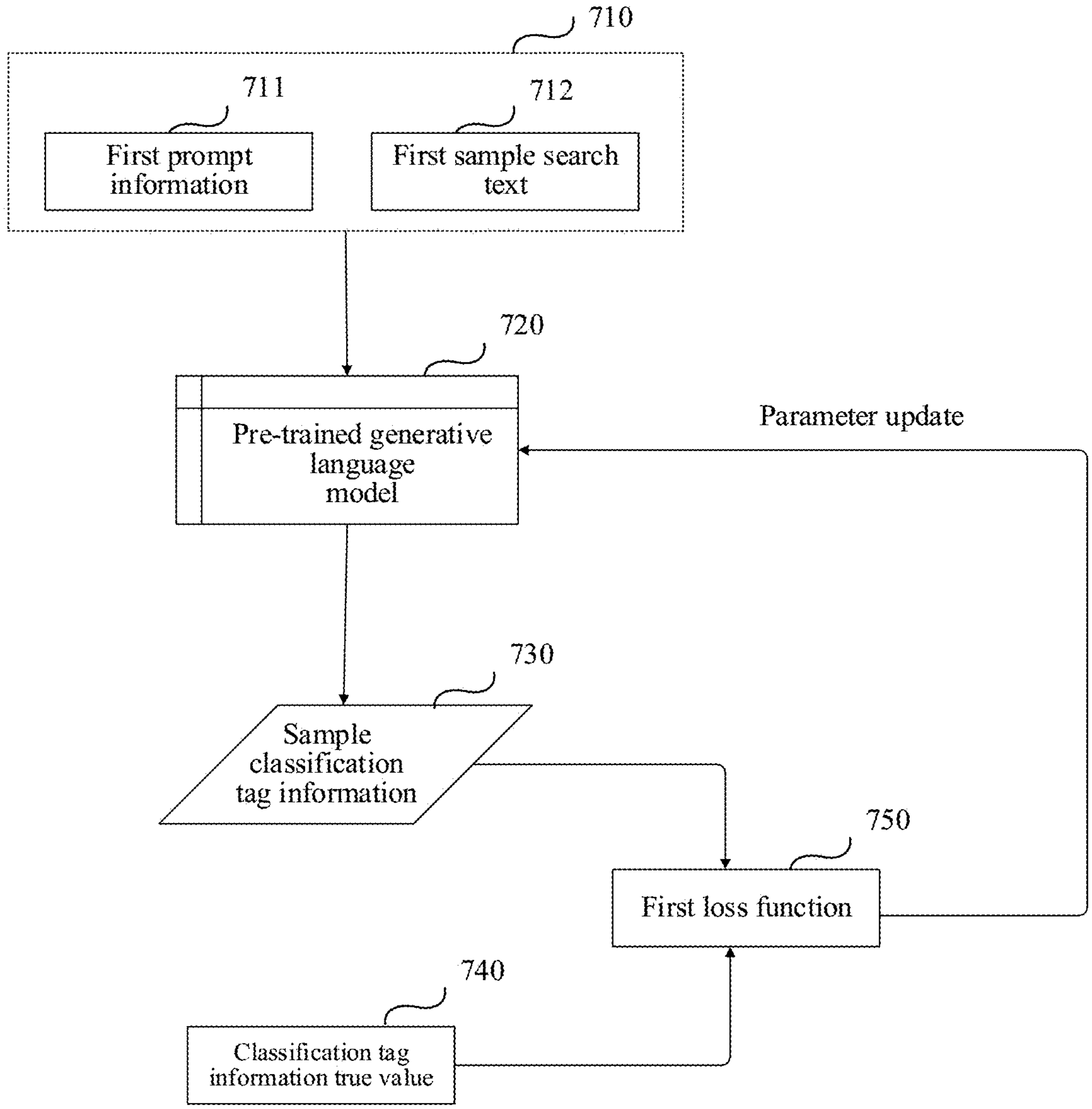
FIG. 7 is a schematic diagram of fine-tuning a pre-trained generative language model by using a training sample including first prompt information according to an exemplary embodiment of this disclosure.

Refer to FIG. 7, FIG. 7 is a schematic diagram of fine-tuning a pre-trained generative language model by using a training sample including first prompt information according to an exemplary embodiment of this disclosure.

As shown in FIG. 7, a training sample 710 includes first prompt information 711 and a first sample search text 712.

With regard to a training process of performing fine-tuning on the pre-trained generative language model, the first prompt information 711 and the first sample search text 712 may be input into a pre-trained generative language model 720, to obtain sample classification tag information 730. A first loss function 750 is constructed based on the sample classification tag information 730 and a classification tag information true value 740 corresponding to the first sample search text 712, and a parameter of the pre-trained generative language model 720 is iteratively updated based on the first loss function 750 to perform model training.

The first sample search text 712 is multiple groups of pre-collected map search content. The classification tag information true value 740 is at least one actual classification tag corresponding to each group of map search content. In some embodiments, the classification tag information true value 740 may be obtained based on manual annotation. In some embodiments, the classification tag information true value 740 may be generated based on the generative language model, and determined through manual verification or rectification.

In some embodiments, the first loss function 750 is a cross entropy loss function.

In some embodiments, various methods may be used for training. For example, the training may be performed based on a gradient descent method. When a preset condition is satisfied, the training is ended, and the trained generative language model is obtained. The preset condition may be that a loss function converges, a quantity of iterations reaches a threshold, or the like.

When the map search content is input into the generative language model, to make an output result of the model the requirement description information, second prompt information may be input into the generative language model, to prompt that an output format of the output result is the requirement description information.

In some embodiments, the map search content and the second prompt information are input into the generative language model, to obtain the requirement description information output by the generative language model.

In some embodiments, the second prompt information is a sentence or a segment of a natural language text. For example, the second prompt information may be "please describe the search requirement" or "please summarize what requirement the map search content has".

In some embodiments, the second prompt information and the map search content may be concatenated, and a text obtained through the concatenation is input into the generative language model. The second prompt information may be located at any position including the beginning, the middle, or the end of the text.

In some embodiments, a same server may perform a training process and an application process of the generative language model, or different servers may perform a training process and an application process of the generative language model. This is not limited in this specification.

In this embodiment, the pre-trained generative language model is fine-tuned by using the training sample including the first prompt information, so that the model generates the classification tag information based on the output format prompted by the first prompt information. When the second prompt information is input, because of a strong semantic understanding capability of the generative language model, the model may generate the requirement description information based on the output format prompted by the second prompt information.

In addition, because when the generative language model is trained, classification tag information true values do not directly reflect specific content of data (such as POI data and LBS data) stored in the map database, data is not leaked to the generative language model by using the method of this embodiment, thereby improving data security of map search.

A real-time location of the user may affect determining of the search result. For example, when the user is located in the region A, a search result corresponding to map search content "tasty squab restaurants" may be a squab restaurant located in the region A rather than a squab restaurant located in a region B. In this way, it may be implemented that a suitable location in proximity is recommended to the user.

In some embodiments, the map application may ask the user for a positioning permission, and enable the positioning permission after the user agrees. In some embodiments, when the positioning permission is enabled, the map search request includes a real-time location.

In some embodiments, the real-time location is latitude and longitude coordinates of the terminal in real time.

In some embodiments, real-time location prompt information may be determined based on the real-time location. For example, the real-time location prompt information may be determined based on a province, city, district, or street to which the real-time location belongs.

In some embodiments, the real-time location prompt information is a sentence or a segment of a natural language text. For example, the real-time location information may be "the current real-time location of the user is the street XX, district XX, city XX, province XX".

Figure 8:
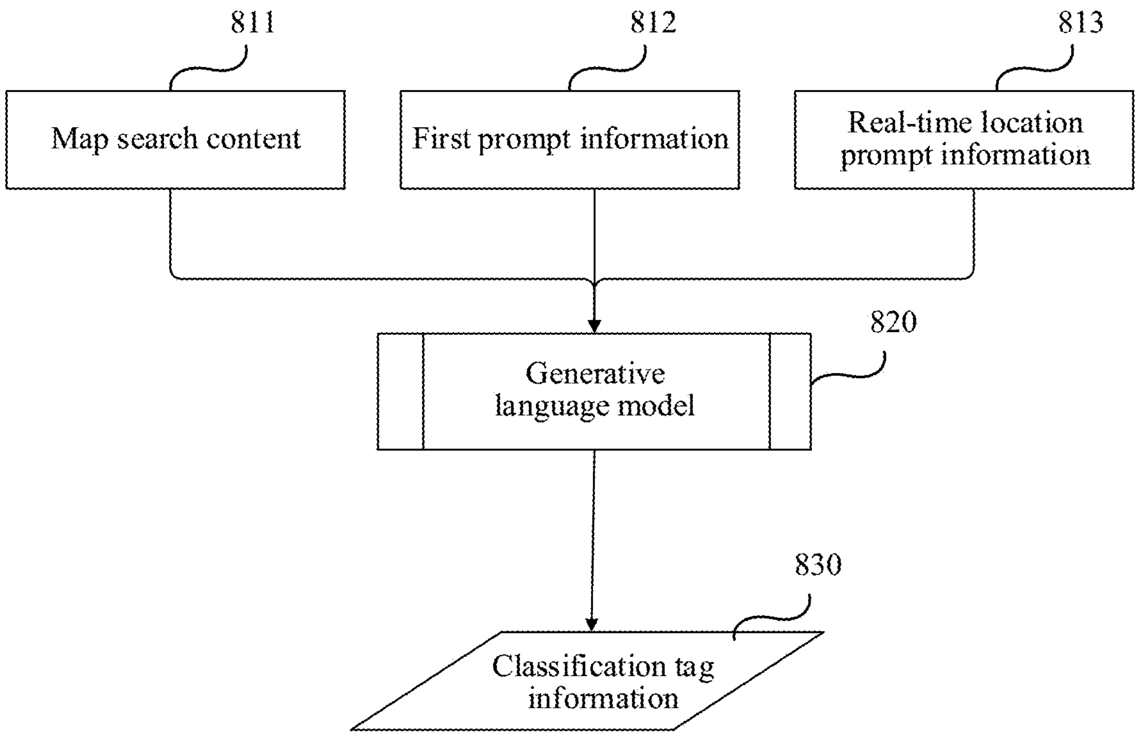
FIG. 8 is a schematic diagram of determining classification tag information based on real-time location prompt information according to an exemplary embodiment of this disclosure.

Refer to FIG. 8, FIG. 8 is a schematic diagram of determining classification tag information based on real-time location prompt information according to an exemplary embodiment of this disclosure.

As shown in FIG. 8, map search content 811, first prompt information 812, and real-time location prompt information 813 are input into a generative language model 820, to obtain classification tag information 830 output by the generative language model 820.

The real-time location prompt information is configured for prompting a real-time location of the map search request. To enable the generative language model to understand a meaning of the real-time location prompt information, a pre-trained generative language model may be trained by using a training sample including the real-time location prompt information. The training process is performing fine-tuning based on pre-training.

Specifically, a sample real-time search text, the first prompt information, and the real-time location prompt information may be input into the pre-trained generative language model, to obtain sample real-time classification tag information. A loss function is constructed based on sample real-time classification tag information and a classification tag information true value corresponding to the sample real-time search text, and a parameter of the pre-trained generative language model is iteratively updated based on the loss function to perform model training.

The sample real-time search text is multiple groups of pre-collected map search content with the positioning permission enabled. The classification tag information true value corresponding to the sample real-time search text is at least one actual classification tag corresponding to each group of map search content with the positioning permission enabled.

In some embodiments, the classification tag information true value may be obtained based on manual annotation. In some embodiments, the classification tag information true value may be generated based on the generative language model, and determined through manual verification or rectification.

In some embodiments, the loss function is a cross entropy loss function.

In some embodiments, various methods may be used for training. For example, the training may be performed based on a gradient descent method. When a preset condition is satisfied, the training is ended, and the trained generative language model is obtained. The preset condition may be that a loss function converges, a quantity of iterations reaches a threshold, or the like.

In some embodiments, a same server may perform a training process and an application process of the generative language model, or different servers may perform a training process and an application process of the generative language model. This is not limited in this specification.

Figure 9:
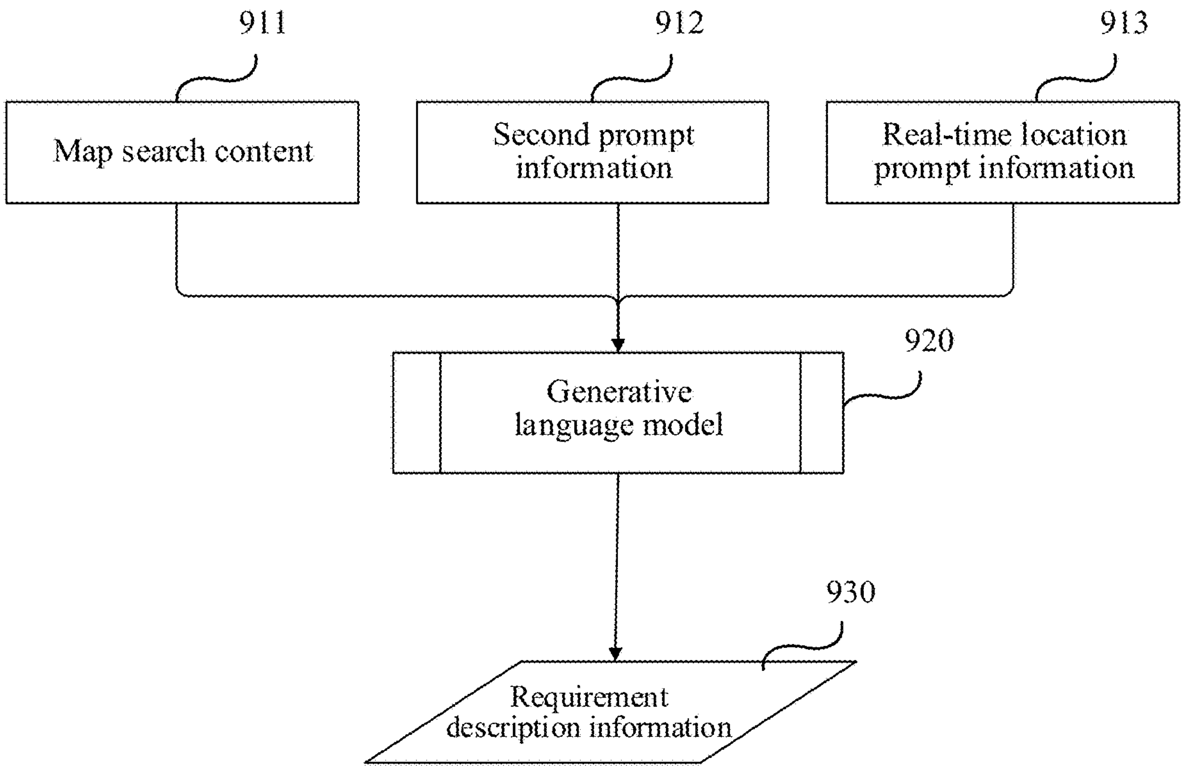
FIG. 9 is a schematic diagram of determining requirement description information based on real-time location prompt information according to an exemplary embodiment of this disclosure.

Refer to FIG. 9, FIG. 9 is a schematic diagram of determining requirement description information based on real-time location prompt information according to an exemplary embodiment of this disclosure.

As shown in FIG. 9, map search content 911, second prompt information 912, and real-time location prompt information 913 are input into a generative language model 920, to obtain requirement description information 930 output by the generative language model 920.

The real-time location prompt information is configured for prompting a real-time location of the map search request.

To enable the generative language model to understand a meaning of the real-time location prompt information, a pre-trained generative language model may be trained by using a training sample including the real-time location prompt information. The training process is performing fine-tuning based on pre-training.

Specifically, a sample real-time search text, the second prompt information, and the real-time location prompt information may be input to the pre-trained generative language model, to obtain the sample real-time requirement description information.

A loss function is constructed based on the sample real-time requirement description information and a requirement description information true value corresponding to the sample real-time search text, and a parameter of the pre-trained generative language model is iteratively updated based on the loss function to perform model training.

The sample real-time search text is multiple groups of pre-collected map search content with a positioning permission enabled. The requirement description information true value corresponding to the sample real-time search text is at least one actual requirement description corresponding to each group of map search content with the positioning permission enabled.

In some embodiments, the requirement description information true value may be obtained based on manual annotation. In some embodiments, the requirement description information true value may be generated based on the generative language model, and determined through manual verification or rectification.

In some embodiments, vectorization may be performed on the sample real-time requirement description information, to obtain a sample description vector. Vectorization is performed on the requirement description information true value, to obtain a true value description vector. A loss function is constructed based on a difference between the sample description vector and the true value description vector.

In some embodiments, the loss function is a cross entropy loss function.

In some embodiments, various methods may be used for training. For example, the training may be performed based on a gradient descent method. When a preset condition is satisfied, the training is ended, and the trained generative language model is obtained. The preset condition may be that the loss function converges, a quantity of iterations reaches a threshold, or the like.

In some embodiments, a same server may perform a training process and an application process of the generative language model, or different servers may perform a training process and an application process of the generative language model. This is not limited in this specification.

In this embodiment, the pre-trained generative language model is fine-tuned by using the sample real-time search text. When the positioning permission is enabled, a search result may be determined based on a real-time location of a user, so as to recommend a result that satisfies a requirement and that is relatively close to the user, thereby improving map search efficiency.

In a possible scenario, in addition to obtaining the search result, the user also wants to further understand a question related to the search result.

For example, for the map search content "the best squab restaurant in a region A", in addition to searching for a squab restaurant with a highest comprehensive rating in the region A, the user may also want to know more about a difference between this restaurant and another squab restaurant, how to make an appointment and get an appointment number, or what means of transportation could be chosen to reach the restaurant the fastest, and another related question.

For another, example, for the map search content "what is the fastest way to go from Du Fu Thatched Cottage to People's Park", in addition to obtaining a navigation route with shortest time, the user may also want to know whether tolls are to be incurred by following the navigation route, how many traffic lights there are along the way, or whether there are any driving time restrictions, and the like.

Therefore, after the search result matching the search requirement information is obtained through querying the preset map database, an interaction question may be further determined. The interaction question is a question related to a search result.

In some embodiments, the interaction question is a sentence or a segment of a natural language text.

In some embodiments, after the server feeds back the search result to the terminal, so that the terminal presents the search result on the map interface, the server may further feed back the interaction question to the terminal, so that the terminal presents the interaction question on the map interface.

Figure 10:
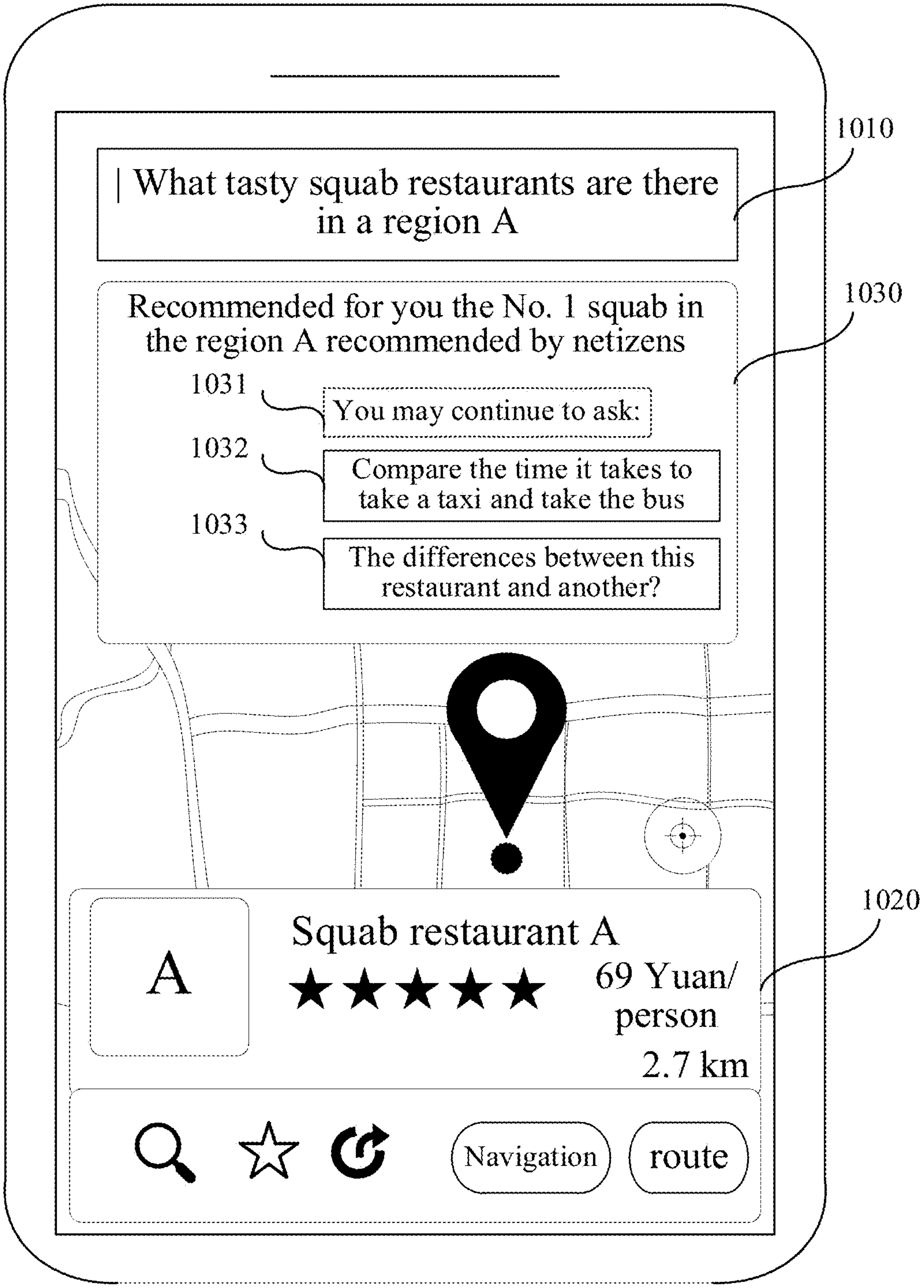
FIG. 10 is a schematic diagram of displaying interactive information according to an exemplary embodiment of this disclosure.

Refer to FIG. 10, FIG. 10 is a schematic diagram of displaying interactive information according to an exemplary embodiment of this disclosure.

As shown in FIG. 10, when the user inputs the map search content "what tasty squab restaurants are there in a region A" in a search bar 1010 on a map interface, the server receives the map search request and feeds back the search result to the terminal, and the terminal displays the search result (squab restaurant A) in a form of a location card 1020 on the map interface.

After presenting the search result, the server may further feed back an interaction question on the terminal, so that the terminal presents the interaction question on the map interface.

As shown in FIG. 10, the terminal displays an interaction box 1030 on the map interface, to interact with the question related to the search result.

Exemplarily, the interaction box 1030 may include an interaction prompt box 1031. The interaction prompt box 1031 displays a text "You may continue to ask", to prompt the user that the interaction question may be further asked or viewed.

Exemplarily, the interaction box 1030 may further include a first interaction question box 1032 and a second interaction question box 1033. The first interaction question box 1032 displays a text "Compare the time it takes to take a taxi and take the bus", and the second interaction question box 1033 displays a text "The differences between this restaurant and another restaurant".

The user may trigger the first interaction question box 1032 and the second interaction question box 1033, to obtain an answer to a corresponding interaction question.

For example, the user may click on the first interactive question box 1032 to performing triggering. After triggering is performed through clicking, the map interface displays a corresponding text answer, such as "It is estimated that it will take 20 minutes to take a taxi and 35 minutes to take a bus".

With regard to an interaction question generation manner, in a possible implementation, after the search result matching the search requirement information is obtained through querying the preset map database, the search result, the map search content, and third prompt information may be input into a generative language model, to obtain the interaction question output by the generative language model.

In some embodiments, the third prompt information is a sentence or a segment of a natural language text. For example, the third prompt information may be "Please generate an interaction question related to the search result" or "Please output another question that the user may continue to ask about the location".

The third prompt information is configured for prompting that an output format of an output result of the generative language model is an interaction question. To enable the generative language model to understand a meaning of the third prompt information, a pre-trained generative language model may be trained by using a training sample including the third prompt information. The training process is performing fine-tuning based on pre-training.

Figure 11:
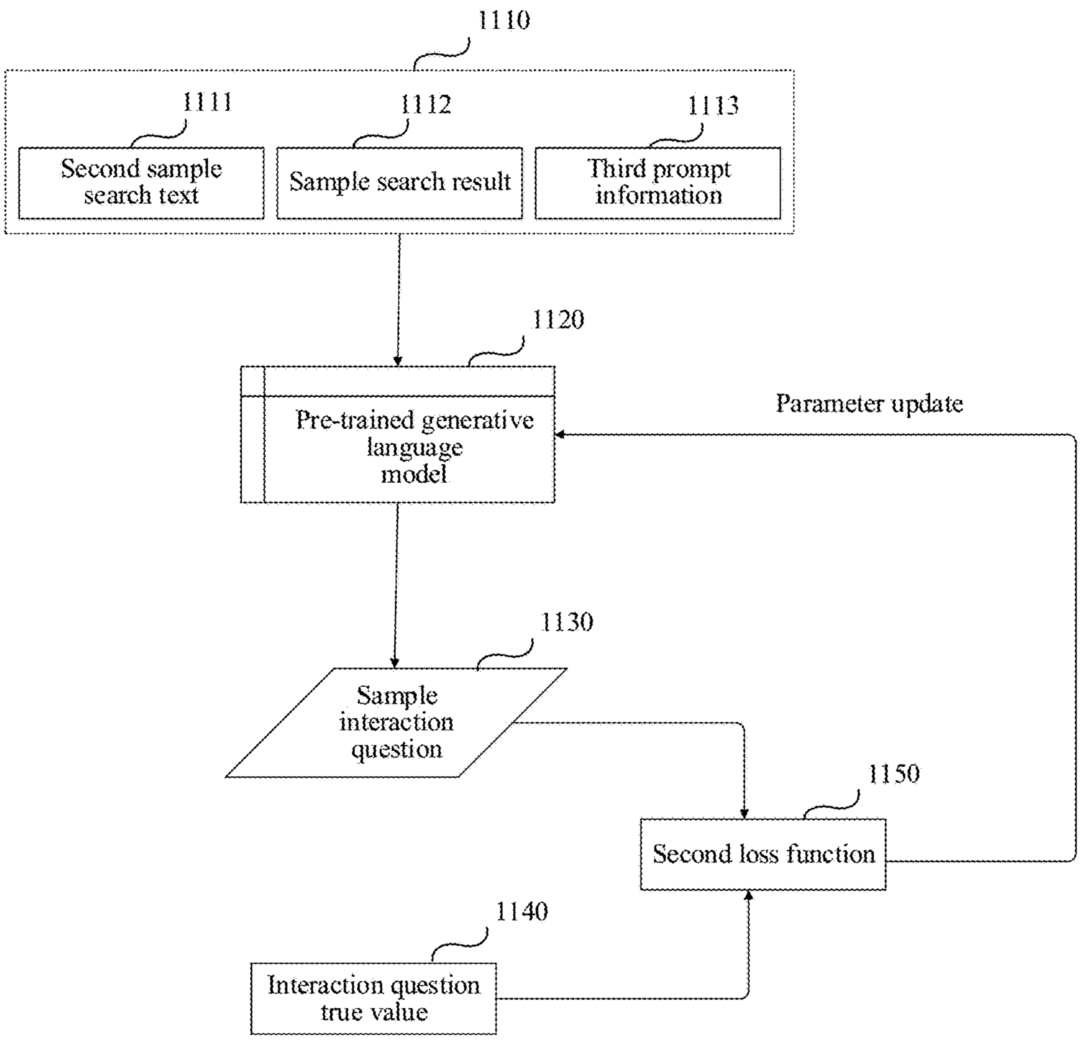
FIG. 11 is a schematic diagram of fine-tuning a pre-trained generative language model by using a training sample including third prompt information according to an exemplary embodiment of this disclosure.

Refer to FIG. 11, FIG. 11 is a schematic diagram of fine-tuning a pre-trained generative language model by using a training sample including third prompt information according to an exemplary embodiment of this disclosure.

As shown in FIG. 11, a training sample 1110 includes a second sample search text 1111, a sample search result 1112, and third prompt information 1113.

In a training process of performing fine-tuning on the pre-trained generative language model, the second sample search text 1111, the sample search result 1112, and the third prompt information 1113 may be input into the pre-trained generative language model 1120, to obtain a sample interaction question 1130. A second loss function 1150 is constructed based on the sample interaction question 1130 and an interaction question true value 1140 corresponding to the second sample search text 1111, and a parameter of the pre-trained generative language model 1120 is iteratively updated based on the second loss function 1150 to perform model training.

The second sample search text 1111 is multiple groups of pre-collected map search content. The sample search result 1112 is a search result corresponding to the multiple groups of map search content. The interaction question true value 1140 is at least one actual interaction question corresponding to each group of sample search results. In some embodiments, the interaction question true value 1140 may be obtained based on manual annotation. In some embodiments, the interaction question true value 1140 may be generated based on the generative language model, and determined through manual verification or rectification.

In some embodiments, vectorization may be performed on the sample interaction question 1130, to obtain a sample interaction question vector. Vectorization is performed on the interaction question true value 1140, to obtain a true value interaction question vector. A second loss function 1150 is constructed based on a difference between the sample interaction question vector and the true value interaction question vector.

In some embodiments, the second loss function 1150 is a cross entropy loss function.

In some embodiments, various methods may be used for training. For example, the training may be performed based on a gradient descent method. When a preset condition is satisfied, the training is ended, and the trained generative language model is obtained. The preset condition may be that a loss function converges, a quantity of iterations reaches a threshold, or the like.

In this embodiment, based on the search result, the interaction question is generated by using the generative language model, and is presented to the user, to provide a question related to the search result for the user, thereby enriching use scenarios of map search, improving efficiency of map search, and providing more convenient and intelligent search experience for the user.

Figure 12:
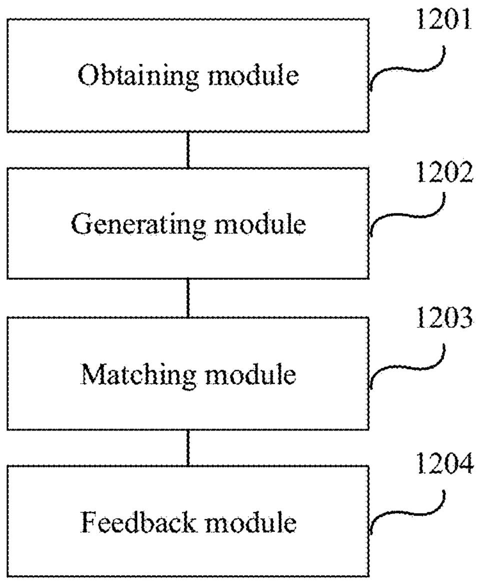
FIG. 12 is a structural block diagram of a map search apparatus according to an exemplary embodiment of this disclosure.

Refer to FIG. 12, FIG. 12 is a structural block diagram of a map search apparatus according to an exemplary embodiment of this disclosure, the apparatus includes:

- an obtaining module 1201, configured to obtain a map search request transmitted by a terminal, the map search request including map search content, and the map search content being natural language content;
- a generating module 1202, configured to input the map search content into a generative language model in response to the map search request, to obtain search requirement information generated by the generative language model, the search requirement information being configured for representing a search requirement of the map search content;
- a matching module 1203, configured to query a preset map database for a search result matching the search requirement information; and
- a feedback module 1204, configured to feed back the search result to the terminal, so that the terminal presents the search result on a map interface.

In some embodiments, the generating module 1202 is configured to:

- input the map search content into a generative language model in response to the map search request, to obtain classification tag information and requirement description information that are generated by the generative language model, the classification tag information includes at least one classification tag corresponding to the search requirement, the classification tag is a tag used by a map database for classifying a map element, and the requirement description information is configured for performing natural language description on the search requirement.

In some embodiments, the matching module 1203 is configured to:

- query the map database for at least one candidate search result based on the classification tag information; and
- determine, based on the requirement description information, the search result matching the search requirement information in the at least one candidate search result.

In some embodiments, the matching module 1203 is configured to:

- perform vectorization on the requirement description information, to obtain a requirement description vector;
- obtain a candidate search result vector corresponding to the at least one candidate search result;
- determine a vector distance between the requirement description vector and the candidate search result vector; and
- determine, based on the vector distance, the search result matching the search requirement information in the at least one candidate search result.

In some embodiments, the matching module 1203 is configured to:

- determine a location feature vector corresponding to a candidate location as the candidate search result vector in a case that the candidate search result is the candidate location; and
- obtain a road segment feature vector corresponding to each road segment in a candidate route in a case that the candidate search result is the candidate route;
- generating a candidate route feature vector of the candidate route based on the road segment feature vector;

and determining the candidate route feature vector as the candidate search result vector.

In some embodiments, the generating module 1202 is configured to:

input the map search content and first prompt information to the generative language model, to obtain the classification tag information output by the generative language model; and input the map search content and second prompt information to the generative language model, to obtain the requirement description information output by the generative language model;

where the first prompt information and the second prompt information being configured for prompting an output format of an output result.

In some embodiments, the generating module 1202 is configured to:

input the first prompt information and a first sample search text into a pre-trained generative language model, to obtain sample classification tag information;

construct a first loss function based on the sample classification tag information and a classification tag information true value corresponding to the first sample search text; and perform parameter update on the pre-trained generative language model based on the first loss function.

In some embodiments, in a case that a positioning permission is enabled, the map search request includes a real-time location, and the generating module 1202 is configured to:

input the map search content, the first prompt information, and the real-time location prompt information to the generative language model, to obtain the classification tag information output by the generative language model; the real-time location prompt information being configured for prompting the real-time location of the map search request; and input the map search content, the second prompt information, and the real-time location prompt information to the generative language model, to obtain the requirement description information output by the generative language model.

In some embodiments, after querying the preset map database for the search result matching the search requirement information, the generating module 1202 is configured to:

input the search result, the map search content, and third prompt information to the generative language model, to obtain an interaction question output by the generative language model; the interaction question being a question related to the search result; wherein the third prompt information being configured for prompting an output format of an output result; and after feeding back the search result to the terminal, so that the terminal presents the search result on the map interface, the method further includes:

feeding back the interaction question to the terminal, so that the terminal presents the interaction question on the map interface.

In some embodiments, the generating module 1202 is configured to:

input a second sample search text, a sample search result corresponding to the second sample search text, and the third prompt information to the pre-trained generative language model, to obtain a sample interaction question;

construct a second loss function based on the sample interaction question and an interaction question true value corresponding to the sample search result; and perform parameter update on the pre-trained generative language model based on the second loss function.

Figure 13:
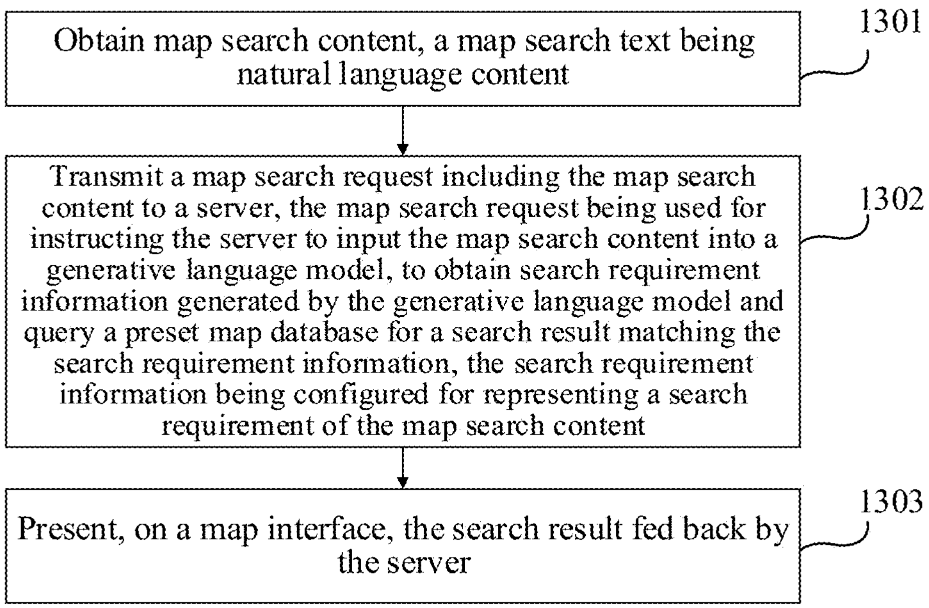
FIG. 13 is a flowchart of a map search method according to another exemplary embodiment of this disclosure.

FIG. 13 is a flowchart of a map search method according to another exemplary embodiment of this disclosure. The method is performed by a terminal, and includes the following operations:

Operation 1301: Obtain map search content, a map search text being natural language content.

The terminal is an electronic device that can run a map application program. The electronic device may be a mobile terminal such as a smartphone, a tablet computer, a laptop computer, or an in-vehicle terminal, or may be a terminal such as a desktop computer or a projection computer.

In some embodiments, the map search content is a natural language text input by a user into a text search bar on a map interface.

In some embodiments, the map search content is based on natural language audio input by a user on an in-vehicle terminal.

For example, the map search content may be one or more words, phrases, sentences, or paragraphs used for map search. For example, the map search content may be "the best squab restaurant in a region A", or "the buildings in a city D have both ancient and modern charm, please plan a tour route from a scenic spot E to a street F for an out-of-town tourist, which needs to pass through at least one special scenic spot in a city D".

Exemplarily, the map search content may be direct descriptions of the map search requirement, for example, "Help me find a mid-range Cantonese restaurant", and "list hospitals in a city C in which corneal cross-linking surgery can be performed". Alternatively, the map search requirement may be indirectly described, for example, "The temperature remains high during the Labor Day holiday, and instead of traveling far away, it is better to meet friends for tea and enjoy air conditioning".

Operation 1302: Transmit a map search request including the map search content to a server, the map search request being used for instructing the server to input the map search content into a generative language model, to obtain search requirement information generated by the generative language model and query a preset map database for a search result matching the search requirement information, the search requirement information being configured for representing a search requirement of the map search content.

The map search request is a request transmitted by the terminal to a server. The map search request includes the map search content, and the map search content is natural language content.

In some embodiments, the map search request is a query request for a location, or a query request for a navigation route.

The search requirement information is information configured for classifying or describing the map search requirement. In some embodiments, the search requirement information may include category tag information. For example, an administrative division or a location category to which the map search requirement belongs. In some embodiments, the search requirement information may include requirement description information, for example, an environment feature and an atmosphere feature of the map search requirement. In some embodiments, the search requirement information may be a natural language text, for example, one or more words, phrases, sentences, or paragraphs.

The map database is a database based on digitalized data of a map. In some embodiments, the map database includes point of interest (POI) data, location based services (LBS) data, and navigation data.

In some embodiments, a source of data in the map database may include satellite data, road network data, surveying and mapping data, crowd-sourced collection data, and the like.

In some embodiments, the source of data in the map database may further include Internet data, user search data, user feedback data, and the like. For example, the map database may include data such as comments of users on merchants and ratings of places that are collected on the Internet.

In some embodiments, data in the map database is updated in real time. For example, the map database may include real-time updated road conditions such as real-time traffic, traffic lights, and road congestion. For another example, the map database may include POI data updated in real time. When information such as an address, a name, and contact information of the POI changes, content in the map database is updated in time.

The search result matching the search requirement information refers to a search result satisfying a search requirement of the map search content.

In some embodiments, there are one or more search results. For example, when the map search content is “the best squab restaurant in a region A”, the search result matching the search requirement information may be a squab restaurant with a highest overall ranking, or multiple squab restaurants (such as top three) with high overall rankings.

In a possible implementation, the server may determine a location query statement or a navigation route query statement based on the search requirement information, and query, based on the location query statement or the navigation route query statement, the map database for the search result matching the search requirement information.

For example, the location query statement or the navigation route query statement may be a DSL statement, a SQL statement, or the like.

Operation 1303: Present, on the map interface, the search result fed back by the server.

In some embodiments, the map interface is an interface corresponding to a map application in the terminal, or an interface corresponding to a map mini program.

In a possible implementation, the terminal presents the search result on the map interface in a form of a position. For example, when the map search content is “the best squab restaurant in a region A”, the terminal displays, on the map interface, a position of the squab restaurant that ranks the highest comprehensively, and displays other information about the squab restaurant.

In a possible implementation, the terminal presents the search result in a form of a list on the map interface. For example, when the map search content is “the best squab restaurant in a region A”, the terminal displays thumbnails of top three squab restaurants in the form of a list in a descending order of comprehensive ratings on the map interface.

In a possible implementation, the terminal presents the search result in a form of a navigation route on the map interface. For example, when the map search content is “a tour route including a scenic spot E and a street F”, the terminal displays a map of a city D on the map interface, and visually identifies one or more recommended tour routes including the scenic spot E and the street F. If there are multiple routes, different colors, shades, and the like may be set based on comprehensive ratings.

The terminal may further present the search result in another form on the map interface. This is not limited in this specification.

In conclusion, the search requirement information is generated by using the generative language model, and the search result is obtained through querying from the map database based on the search requirement information, to further understand a search intention of a user, and recommend an authentic and a reliable search result to the user, thereby improving map search efficiency.

Figure 14:
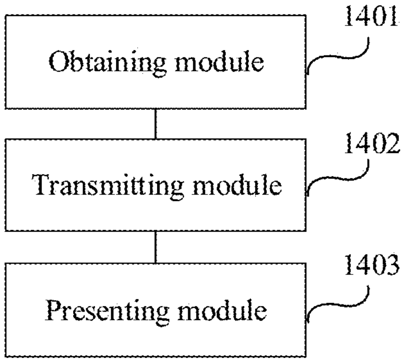
FIG. 14 is a structural block diagram of a map search apparatus according to another exemplary embodiment of this disclosure.

Refer to FIG. 14, FIG. 14 is a structural block diagram of a map search apparatus according to another exemplary embodiment of this disclosure, the apparatus comprises:

an obtaining module 1401, configured to obtain map search content, the map search content being natural language content;

a transmitting module 1402, configured to transmit a map search request including the map search content to a server, the map search request being used for instructing the server to input the map search content into a generative language model, to obtain search requirement information generated by the generative language model and query a preset map database for a search result matching the search requirement information, the search requirement information being configured for representing a search requirement of the map search content; and a presentation module 1403, configured to present, on a map interface, the search result fed back by the server.

In this disclosure, in a process of collecting related data (such as a real-time location) of a user, a prompt interface, a pop-up window, or voice prompt information may be displayed, where the prompt interface, the pop-up window, or the voice prompt information is configured for prompting, for the user, that related data of the user is currently being collected, so that in this disclosure, only after a confirmation operation performed by the user on the prompt interface or the pop-up window is obtained, a related operation of obtaining the related data of the user is started, and otherwise (that is, when the confirmation operation performed by the user on the prompt interface or the pop-up window is not obtained), the related operation of obtaining the related data of the user is terminated, that is, skipping obtaining the related data of the user. In other words, information (including but not limited to user device information, user personal information, a user’s real-time location), data (including but not limited to data used for analysis, stored data, displayed data, and the like), and signals involved in this disclosure are all authorized by the user or fully authorized by all parties, and collection, use and processing of relevant data needs to comply with relevant laws, regulations, and standards in relevant countries and regions. For example, the real-time location of the user and the like involved in this disclosure are all obtained under full authorization.

Figure 15:
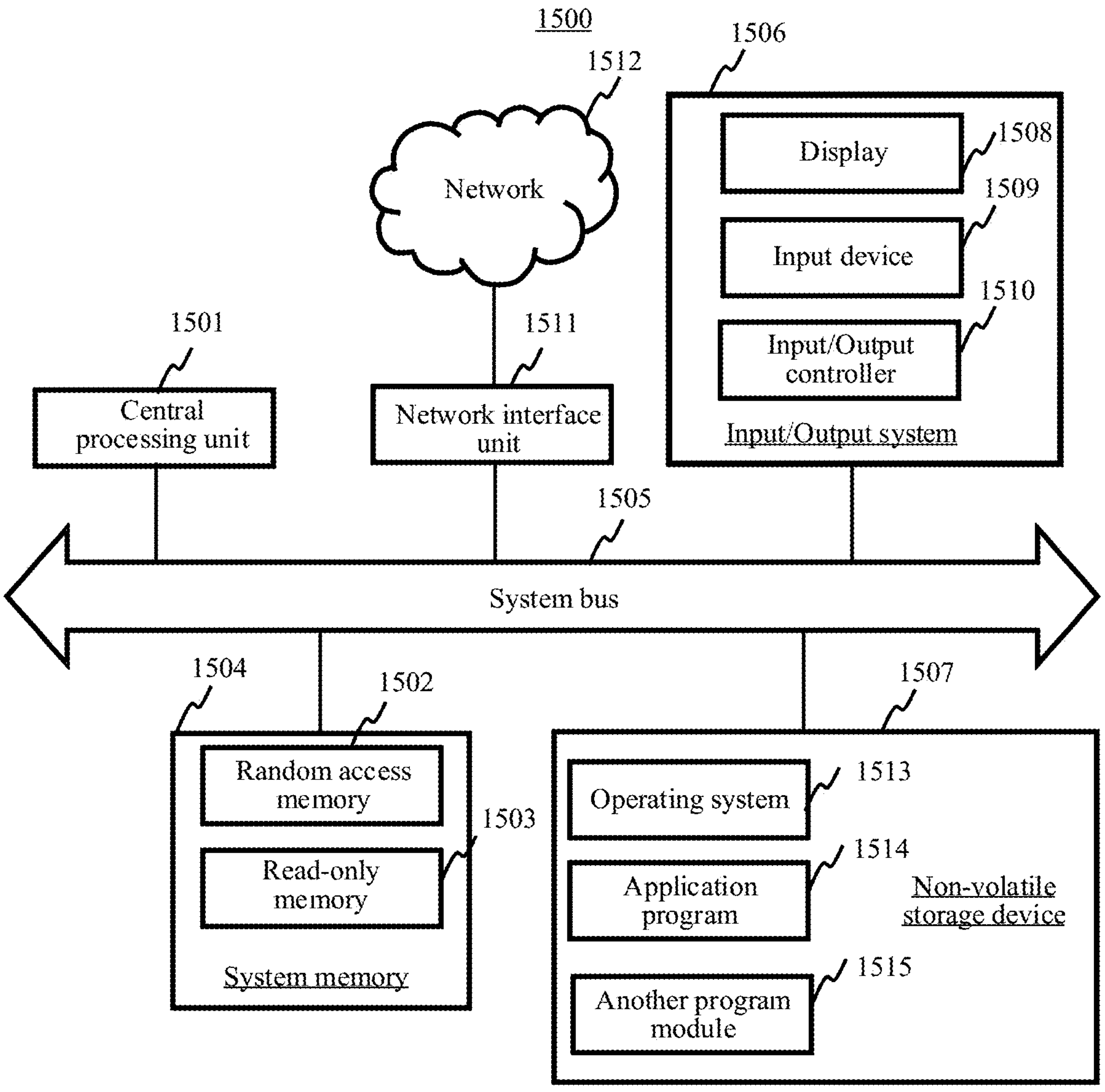
FIG. 15 is a schematic diagram of a structure of a computer device according to an exemplary embodiment of this disclosure.

Refer to FIG. 15, FIG. 15 is a schematic diagram of a structure of a computer device according to an exemplary embodiment of this disclosure. The computer device 1500 may be implemented as the server or the terminal in the foregoing embodiments.

Specifically, the computer device 1500 includes a central processing unit (CPU) 1501, a system memory 1504 including a random access memory 1502 and a read-only memory 1503, and a system bus 1505 connecting the system memory 1504 and the central processing unit 1501. The computer device 1500 also includes a basic input/output system (I/O system) 1506 for facilitating information transmission between various components within the computer, and a non-volatile storage device 1507 for storing an operating system 1513, an application program 1514 and another program module 1515.

The basic input/output system 1506 includes a display 1508 for displaying information and an input device 1509 such as a mouse and a keyboard for user inputting information. The display 1508 and the input device 1509 are connected to the central processing unit 1501 via an input-output controller 1510 connected to the system bus 1505. The basic input/output system 1506 may further include an input/output controller 1510 for receiving and processing input from a keyboard, a mouse, an electronic stylus, or another device. Similarly, the input/output controller 1510 further provides an output to a display screen, a printer, or another type of output device.

The non-volatile storage device 1507 is connected to the central processing unit 1501 via a memory controller (not shown) connected to the system bus 1505. The non-volatile storage device 1507 and associated computer-readable media thereof provide non-volatile storage for the computer device 1500. That is, the non-volatile storage device 1507 may include a computer-readable medium (not shown) such as a hard disk or a drive.

Without loss of generality, the computer-readable medium may include computer storage media and communication media. The computer storage medium includes volatile and non-volatile media, and removable and non-removable media implemented by using any method or technology used for storing information such as computer-readable instructions, data structures, program modules, or other data. The computer storage medium includes a random access memory (RAM), a read-only memory (ROM), a flash memory or another solid storage technology, a compact disc read-only memory (CD-ROM), a digital versatile disc (DVD) or another optical storage, a cassette, a magnetic tape, a disk storage or another magnetic storage device. Certainly, a person skilled in the art may learn that the computer storage medium is not limited to the foregoing several types. The above-mentioned system memory 1504 and non-volatile storage device 1507 can be collectively referred to as memory.

The memory stores one or more programs, the one or more programs are configured to be executed by one or more CPUs 1501, the one or more programs include instructions used to implement the foregoing methods, and the CPU 1501 executes the one or more programs to implement the methods provided in the foregoing method embodiments.

According to various embodiments of this disclosure, the computer device 1500 may also be connected to a remote computer on a network such as the Internet for execution. That is, the computer device 1500 can be connected to the network 1512 through the network interface unit 1511 connected to the system bus 1505, or the network interface unit 1511 can be used to connect to other types of networks or remote computer systems (not shown).

The memory also includes one or more programs, which are stored in the memory and include operations for performing the method provided in the embodiment of this disclosure and executed by the computer device.

An embodiment of this disclosure further provides a computer-readable storage medium, having at least one instruction stored therein. The at least one instruction is loaded and executed by a processor to implement the method described in any of the above embodiments.

In some embodiments, the computer-readable storage medium may include: a ROM, a RAM, a solid state drive (SSD), an optical disk, and the like. The RAM may include resistance random access memory (ReRAM) and dynamic random access memory (DRAM).

An embodiment of this disclosure provides a computer program product, which includes computer instructions stored in a computer-readable storage medium. The processor of the computer device reads the computer instructions from the computer-readable storage medium, and the processor executes the computer instructions, so that the computer device performs the method in the foregoing embodiment.

A person of ordinary skill in the technology may understand that all or some of the operations of the foregoing embodiments may be implemented by hardware, or may be implemented by a program instructing relevant hardware. The program may be stored in a computer-readable storage medium. The storage medium may be a read-only memory, a magnetic disk, an optical disc, or the like. The above description is only an optional embodiment of this disclosure and is not intended to limit this disclosure. Any modification, equivalent replacement, improvement, etc. made within the spirit and principle of this disclosure shall be included in the protection scope of this disclosure.

Technical features of the foregoing embodiments may be combined in different manners to form other embodiments. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of this disclosure, which are described specifically and in detail, but cannot be construed as a limitation to the patent scope of this disclosure. For a person of ordinary skill in the art, several transformations and improvements can be made without departing from the idea of this disclosure. These transformations and improvements belong to the protection scope of this disclosure. Therefore, the protection scope of the patent of this disclosure shall be subject to the appended claims.

What is claimed is:

1. A map search method, performed by a server, comprising:

obtaining a map search request transmitted by a terminal, the map search request comprising map search content, wherein the map search content comprises natural language content;

inputting the map search content into a generative language model, to obtain search requirement information, wherein the search requirement information is configured to represent a search requirement of the map search content;

querying a preset map database for at least one candidate search result corresponding to the search requirement information;

determining a search result from the at least one candidate search result by comparing a vector representation of at least a portion of the search requirement information with vector representations of the at least one candidate search result; and feeding back the search result to the terminal to trigger the terminal to present the search result on a map interface.

2. The method according to claim 1, wherein the search requirement information comprises classification tag information and requirement description information, the classification tag information comprises at least one classification tag corresponding to the search requirement, the requirement description information is configured for performing natural language description on the search requirement, and the querying the preset map database for the search result matching the search requirement information comprises:

querying the preset map database for at least one candidate search result based on the classification tag information; and determining, based on the requirement description information, the search result matching the search requirement information in the at least one candidate search result.

3. The method according to claim 2, wherein the determining, based on the requirement description information, the search result matching the search requirement information in the at least one candidate search result comprises:

performing vectorization on the requirement description information, to obtain a requirement description vector;

obtaining a candidate search result vector corresponding to the at least one candidate search result;

determining a vector distance between the requirement description vector and the candidate search result vector; and determining, based on the vector distance, the search result matching the search requirement information in the at least one candidate search result.

4. The method according to claim 3, wherein the obtaining the candidate search result vector corresponding to the at least one candidate search result comprises:

determining a location feature vector corresponding to a candidate location as the candidate search result vector in a case that the candidate search result is the candidate location;

obtaining a road segment feature vector corresponding to each road segment in a candidate route in a case that the candidate search result is the candidate route;

generating a candidate route feature vector of the candidate route based on the road segment feature vector; and determining the candidate route feature vector as the candidate search result vector.

5. The method according to claim 2, wherein the inputting the map search content into the generative language model, to obtain the search requirement information comprises:

inputting the map search content into the generative language model, to obtain the search requirement information inputting the map search content and first prompt information to the generative language model, to obtain the classification tag information; and inputting the map search content and second prompt information to the generative language model, to obtain the requirement description information.

6. The method according to claim 5, wherein a training method of the generative language model comprises:

inputting the first prompt information and a first sample search text into a pre-trained generative language model, to obtain sample classification tag information;

constructing a first loss function based on the sample classification tag information and a classification tag information true value corresponding to the first sample search text; and performing a parameter update on the pre-trained generative language model based on the first loss function.

7. The method according to claim 5, wherein the map search request comprises a real-time location, and the inputting the map search content into the generative language model in response to the map search request, to obtain the classification tag information and the requirement description information comprises:

inputting the map search content, the first prompt information, and real-time location prompt information to the generative language model, to obtain the classification tag information, wherein the real-time location prompt information is configured for prompting the real-time location of the map search request; and inputting the map search content, the second prompt information, and the real-time location prompt information to the generative language model, to obtain the requirement description information.

8. The method according to claim 5, comprising:

inputting the search result, the map search content, and third prompt information to the generative language model, to obtain an interaction question, wherein the interaction question is related to the search result; and feeding back the interaction question to the terminal, to trigger the terminal to present the interaction question on the map interface.

9. The method according to claim 8, wherein a training method of the generative language model comprises:

inputting a second sample search text, a sample search result corresponding to the second sample search text, and the third prompt information to a pre-trained generative language model, to obtain a sample interaction question; and constructing a second loss function based on the sample interaction question and an interaction question true value corresponding to the sample search result; and performing a parameter update on the pre-trained generative language model based on the second loss function.

10. A map search apparatus, comprising:

a memory capable of storing computer-readable instructions; and a processor configured to read the computer-readable instructions, wherein the processor, when executing the computer-readable instructions is configured to:

obtain a map search request transmitted by a terminal, the map search request comprising map search content, wherein the map search content is natural language content;

input the map search content into a generative language model in response to the map search request, to obtain search requirement information generated by the generative language model, wherein the search requirement information is configured to represent a search requirement of the map search content;

query a preset map database for at least one candidate search result matching the search requirement information;

determine a search result from the at least one candidate search result by comparing a vector representation of at least a portion of the search requirement information with vector representations of the at least one candidate search result; and feed back the search result to the terminal to trigger the terminal to present the search result on a map interface.

11. The map search apparatus according to claim 10, wherein the search requirement information comprises classification tag information and requirement description information, the classification tag information comprises at least one classification tag corresponding to the search requirement, the requirement description information is configured for performing natural language description on the search requirement, and the processor, when executing the computer-readable instructions to query the preset map database for the search result matching the search requirement information, is further configured to:

query the preset map database for at least one candidate search result based on the classification tag information; and determine, based on the requirement description information, the search result matching the search requirement information in the at least one candidate search result.

12. The map search apparatus according to claim 11, wherein the processor, when executing the computer-readable instructions to determine, based on the requirement description information, the search result matching the search requirement information in the at least one candidate search result, is configured to:

perform vectorization on the requirement description information, to obtain a requirement description vector;

obtain a candidate search result vector corresponding to the at least one candidate search result;

determine a vector distance between the requirement description vector and the candidate search result vector; and determine, based on the vector distance, the search result matching the search requirement information in the at least one candidate search result.

13. The map search apparatus according to claim 12, wherein the processor, when executing the computer-readable instructions to obtain the candidate search result vector corresponding to the at least one candidate search result, is configured to:

determine a location feature vector corresponding to a candidate location as the candidate search result vector in a case that the candidate search result is the candidate location; and obtain a road segment feature vector corresponding to each road segment in a candidate route in a case that the candidate search result is the candidate route;

generate a candidate route feature vector of the candidate route based on the road segment feature vector; and determine the candidate route feature vector as the candidate search result vector.

14. The map search apparatus according to claim 11, wherein the processor, when executing the computer-readable instructions to input the map search content into the generative language model, to obtain the search requirement information, is configured to:

input the map search content into the generative language model, to obtain the search requirement information;

input the map search content and first prompt information to the generative language model, to obtain the classification tag information; and input the map search content and second prompt information to the generative language model, to obtain the requirement description information.

15. The map search apparatus according to claim 14, wherein the map search request comprises a real-time location, and the processor, when executing the computer-readable instructions to input the map search content into the generative language model in response to the map search request, to obtain the classification tag information and the requirement description information, is configured to:

input the map search content, the first prompt information, and real-time location prompt information to the generative language model, to obtain the classification tag information, wherein the real-time location prompt information is configured for prompting the real-time location of the map search request; and input the map search content, the second prompt information, and the real-time location prompt information to the generative language model, to obtain the requirement description information.

16. The map search apparatus according to claim 14, wherein the processor, when executing the computer-readable instructions, is configured to:

input the search result, the map search content, and third prompt information to the generative language model, to obtain an interaction question, wherein the interaction question is related to the search result; and feed back the interaction question to the terminal to trigger the terminal to present the interaction question on the map interface.

17. A non-transitory computer-readable storage medium for storing a plurality of computer-readable instructions, wherein the plurality of computer-readable instructions, when executed by a processor, are configured to cause the processor to:

obtain a map search request transmitted by a terminal, the map search request comprising map search content, wherein the map search content is natural language content;

input the map search content into a generative language model, to obtain search requirement information, wherein the search requirement information is configured to represent a search requirement of the map search content;

query a preset map database for at least one candidate search result corresponding to the search requirement information;

determine a search result from the at least one candidate search result by comparing a vector representation of at least one portion of the search requirement information with vector representations of the at least one candidate search result; and feed back the search result to the terminal to trigger the terminal to present the search result on a map interface.

18. The storage medium according to claim 17, wherein the search requirement information comprises classification tag information and requirement description information, the classification tag information comprises at least one classification tag corresponding to the search requirement, the requirement description information is configured for performing natural language description on the search requirement, and the plurality of computer-readable instructions that cause the processor to query the preset map database for the search result corresponding to the search requirement information, when executed by the processor, are configured to cause the processor to:

query the preset map database for at least one candidate search result based on the classification tag information; and determine, based on the requirement description information, the search result matching the search requirement information in the at least one candidate search result.

19. The storage medium according to claim 18, wherein the plurality of computer-readable instruction that cause the processor to determine, based on the requirement description information, the search result matching the search requirement information in the at least one candidate search result, when executed by the processor, are configured to cause the processor to:

perform vectorization on the requirement description information, to obtain a requirement description vector;

obtain a candidate search result vector corresponding to the at least one candidate search result;

determine a vector distance between the requirement description vector and the candidate search result vector; and determine, based on the vector distance, the search result matching the search requirement information in the at least one candidate search result.

20. The storage medium according to claim 18, wherein the plurality of computer-readable instructions that cause the processor to input the map search content into the generative language model, to obtain the search requirement information, when executed by the processor, are configured to cause the processor to:

input the map search content into the generative language model, to obtain the search requirement information input the map search content and first prompt information to the generative language model, to obtain the classification tag information; and input the map search content and second prompt information to the generative language model, to obtain the requirement description information.

* * * * *